(12) United States Patent
Jung

(10) Patent No.: US 9,848,470 B2
(45) Date of Patent: Dec. 19, 2017

(54) LED DRIVING CIRCUIT USING DOUBLE BRIDGE DIODE AND LED ILLUMINATION DEVICE COMPRISING SAME

(71) Applicant: Seoul Semiconductor Co., Ltd., Ansan-si (KR)

(72) Inventor: Hye Man Jung, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 235 days.

(21) Appl. No.: 14/778,889

(22) PCT Filed: Mar. 13, 2014

(86) PCT No.: PCT/KR2014/002082
§ 371 (c)(1),
(2) Date: Sep. 21, 2015

(87) PCT Pub. No.: WO2014/148767
PCT Pub. Date: Sep. 25, 2014

(65) Prior Publication Data
US 2016/0050731 A1    Feb. 18, 2016

(30) Foreign Application Priority Data

Mar. 21, 2013  (KR) .................. 10-2013-0030181

(51) Int. Cl.
*H05B 33/08*    (2006.01)
(52) U.S. Cl.
CPC ....... *H05B 33/0824* (2013.01); *H05B 33/083* (2013.01); *H05B 33/0809* (2013.01); *H05B 33/0812* (2013.01); *Y02B 20/348* (2013.01)
(58) Field of Classification Search
None
See application file for complete search history.

(56) References Cited

U.S. PATENT DOCUMENTS 6,483,260 B1 *  11/2002  Flory, IV ............. H05B 41/232
                                                315/315
8,872,434 B2 *  10/2014  Jung ................. H05B 33/0818
                                                315/200 R
(Continued)

FOREIGN PATENT DOCUMENTS

CN      202285447      6/2012
CN      202396059      8/2012
(Continued)

OTHER PUBLICATIONS

International Search Report dated Jun. 25, 2014 in International Application PCT/KR2014/002082.

*Primary Examiner* — Douglas W Owens
*Assistant Examiner* — Srinivas Sathiraju
(74) *Attorney, Agent, or Firm* — H.C. Park & Associates, PLC

(57) ABSTRACT

According to the present invention, provided is an LED driving circuit comprising: a first rectification module, connected to an alternating current power source, for full-wave rectifying an applied alternating current voltage and for supplying a first rectification voltage which has been full-wave rectified to an LED light emitting module as a first driving voltage; and a second driving voltage supply module, connected to the alternating current power source in parallel with the first rectification module, for full-wave rectifying an applied alternating current voltage to generate a second rectification voltage, for charging energy using the generated second rectification voltage at a charging section, and for supplying a second driving voltage to the LED light emitting module at a compensating section.

26 Claims, 9 Drawing Sheets

(56) References Cited

U.S. PATENT DOCUMENTS

| | | | | |
|---|---|---|---|---|
| 9,107,262 B2* | 8/2015 | Jung | | H05B 33/083 |
| 9,345,085 B2* | 5/2016 | Jung | | H05B 33/083 |
| 9,357,605 B2* | 5/2016 | Jung | | H05B 33/0824 |
| 9,378,701 B2* | 6/2016 | Jung | | H05B 33/0824 |
| 9,516,718 B2* | 12/2016 | Jung | | H05B 33/0812 |
| 9,538,599 B2* | 1/2017 | Jung | | H05B 33/0851 |
| 9,585,214 B2* | 2/2017 | Jung | | H05B 33/0824 |
| 9,681,504 B1* | 6/2017 | Barbosa | | H02M 7/06 |
| 2010/0134049 A1* | 6/2010 | Matsuoka | | H05B 33/0809 |
| | | | | 315/307 |
| 2010/0244727 A1* | 9/2010 | Ye | | H05B 33/0809 |
| | | | | 315/291 |
| 2012/0043892 A1* | 2/2012 | Visser | | F21V 25/04 |
| | | | | 315/121 |
| 2012/0098448 A1* | 4/2012 | Kang | | H05B 33/083 |
| | | | | 315/201 |
| 2012/0206057 A1* | 8/2012 | Kim | | H05B 33/0842 |
| | | | | 315/201 |
| 2012/0286683 A1* | 11/2012 | Radermacher | | H05B 33/0815 |
| | | | | 315/201 |
| 2012/0299494 A1* | 11/2012 | Hartikka | | H05B 33/0842 |
| | | | | 315/201 |
| 2013/0307423 A1* | 11/2013 | Lee | | H05B 33/083 |
| | | | | 315/186 |
| 2014/0042918 A1* | 2/2014 | Lee | | H05B 33/0824 |
| | | | | 315/185 R |
| 2014/0362071 A1* | 12/2014 | Jung | | H05B 33/0824 |
| | | | | 345/212 |
| 2015/0334792 A1* | 11/2015 | Jung | | H05B 33/083 |
| | | | | 315/186 |
| 2016/0050731 A1* | 2/2016 | Jung | | H05B 33/0809 |
| | | | | 315/201 |
| 2016/0128153 A1* | 5/2016 | Jung | | H05B 33/0851 |
| | | | | 315/201 |
| 2016/0270168 A1* | 9/2016 | Jung | | H05B 33/0812 |
| 2016/0309558 A1* | 10/2016 | Jung | | H05B 33/0824 |
| 2017/0041991 A1* | 2/2017 | Jung | | H05B 33/0812 |

FOREIGN PATENT DOCUMENTS

| | | | |
|---|---|---|---|
| CN | 102802302 | 11/2012 | |
| KR | 10-2010-0063648 | 6/2010 | |
| KR | 10-2010-0107196 | 10/2010 | |
| KR | 10-2012-0032509 | 4/2012 | |
| KR | 10-2012-0041093 | 4/2012 | |
| WO | WO 2008146974 A1 * | 12/2008 | H01J 63/02 |
| WO | 2011-159002 | 12/2011 | |
| WO | 2012-081878 | 6/2012 | |
| WO | 2012-144800 | 10/2012 | |

* cited by examiner

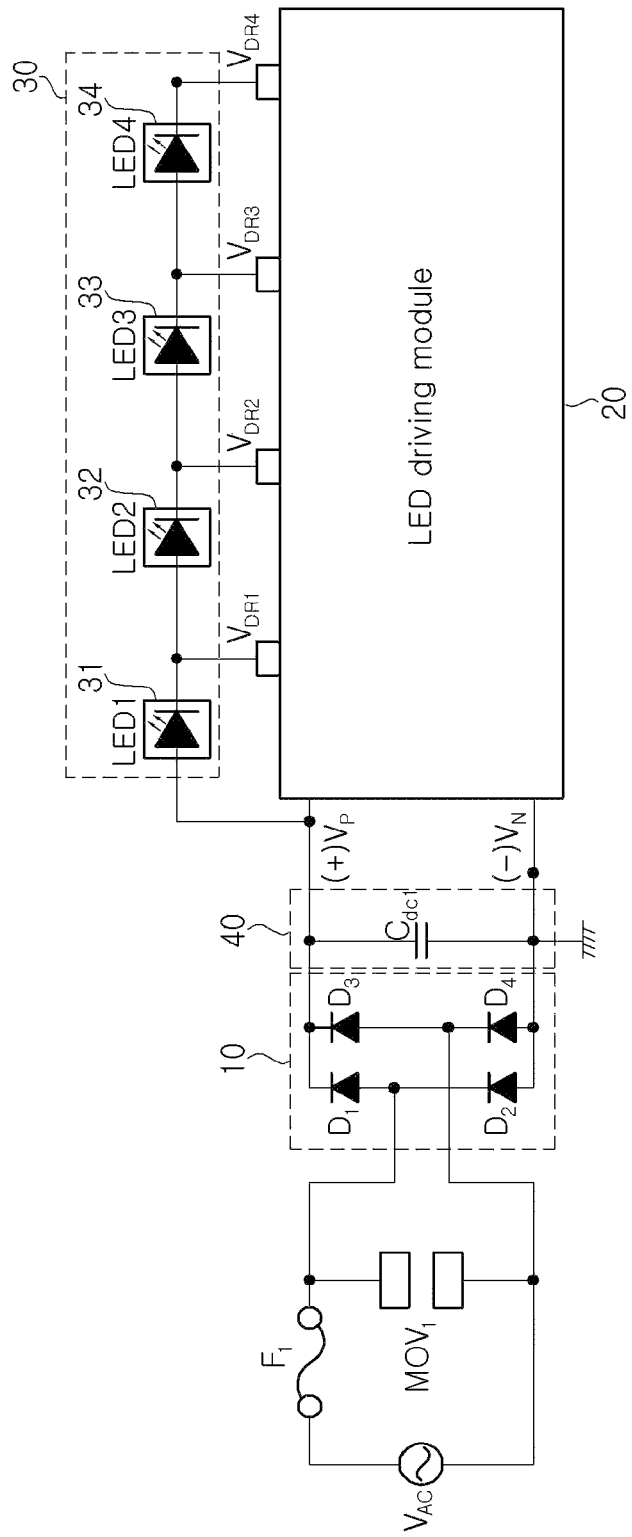
[FIG. 1A]
(Related Art)

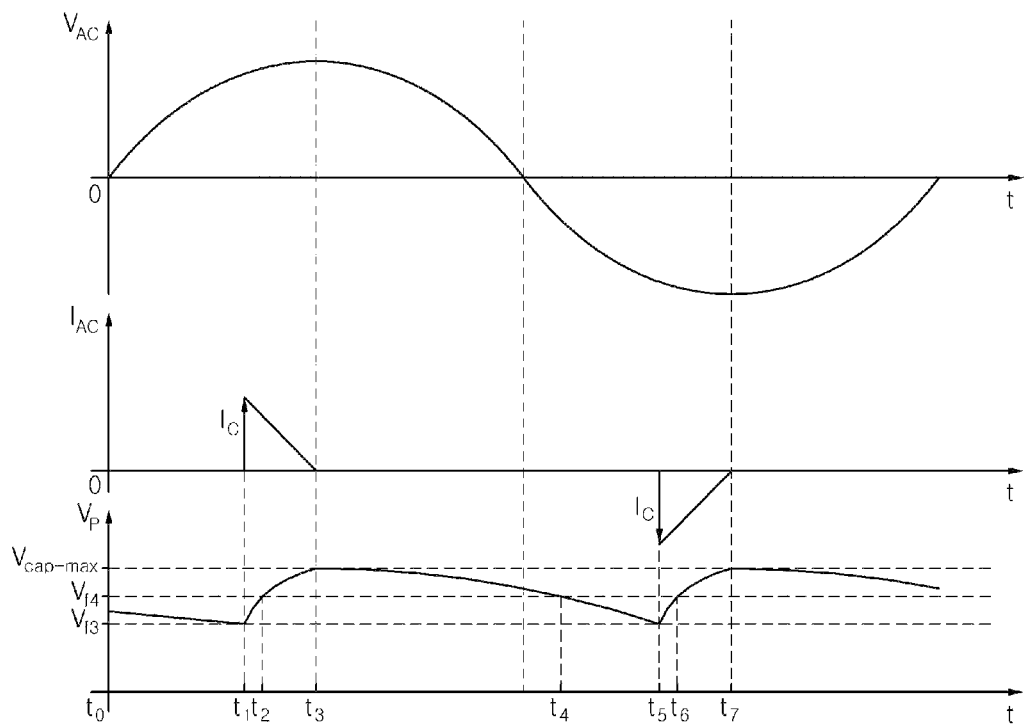
[FIG. 1B]
(Related Art)

[FIG. 2A]
(Related Art)
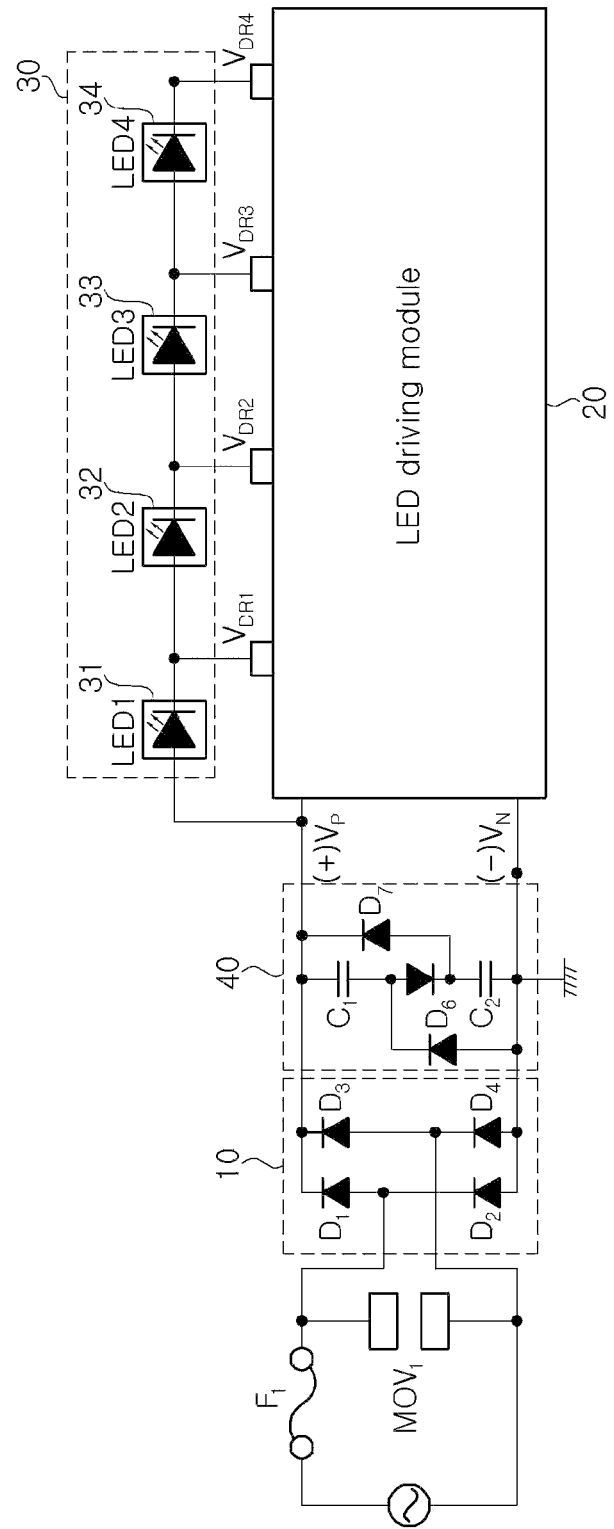

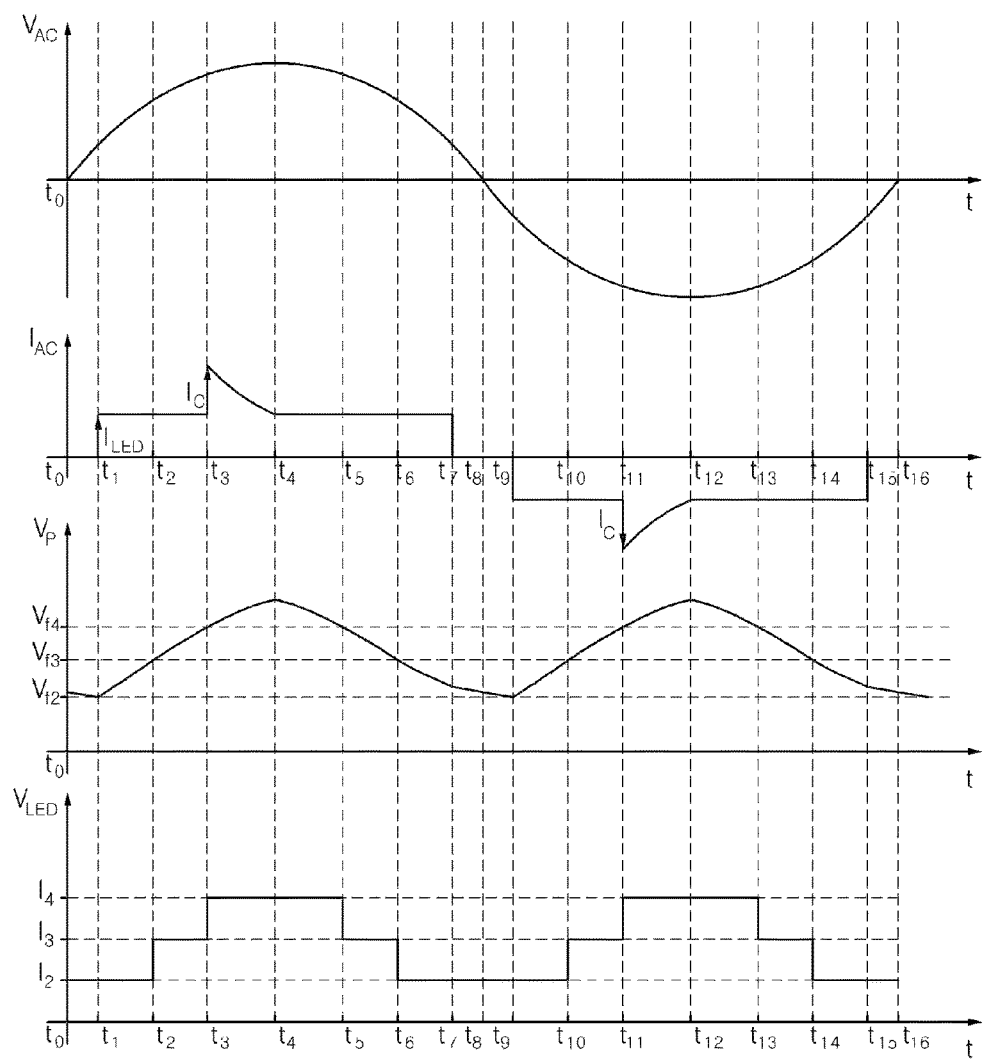
[FIG. 2B]
(Related Art)

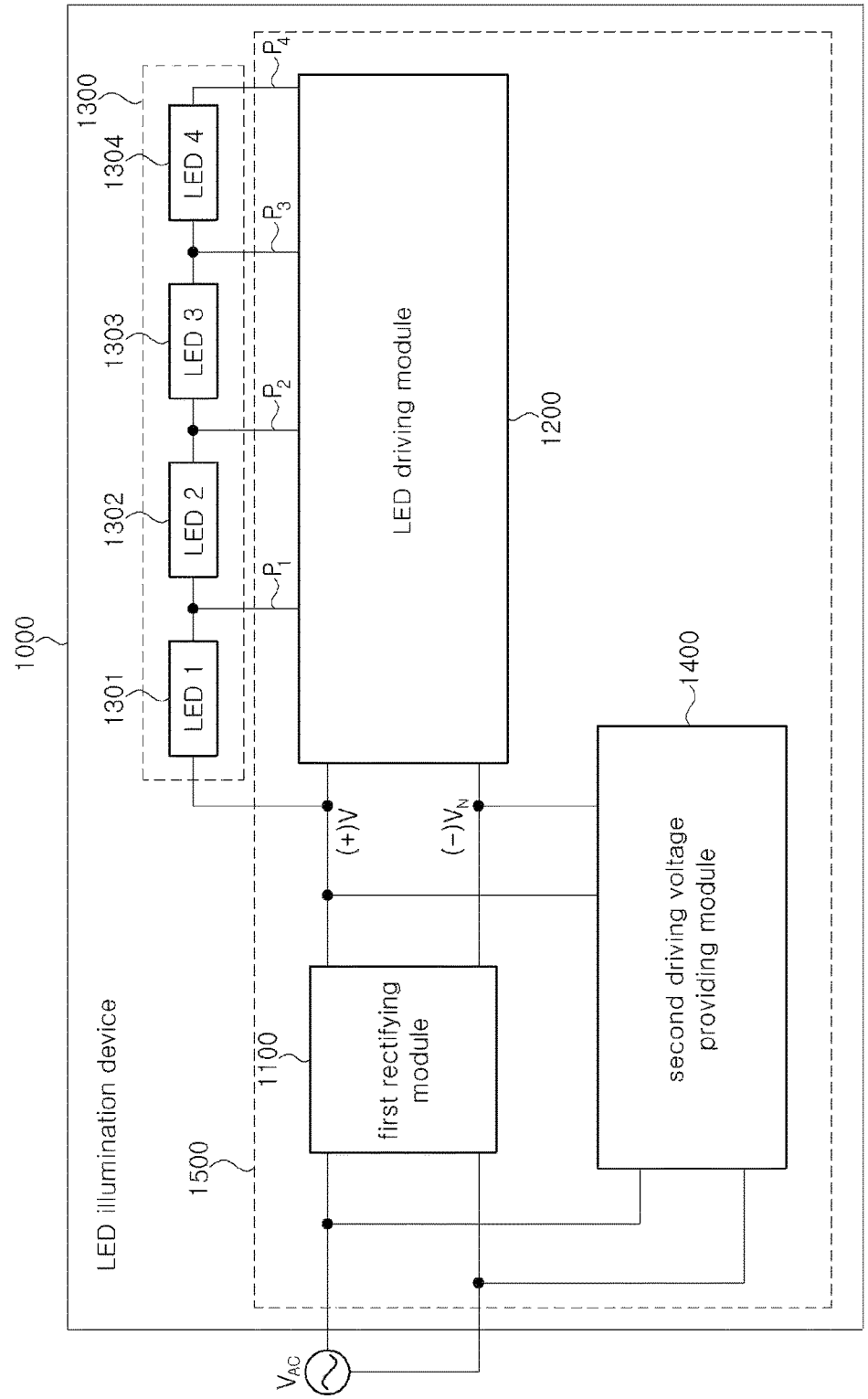
[FIG. 3]

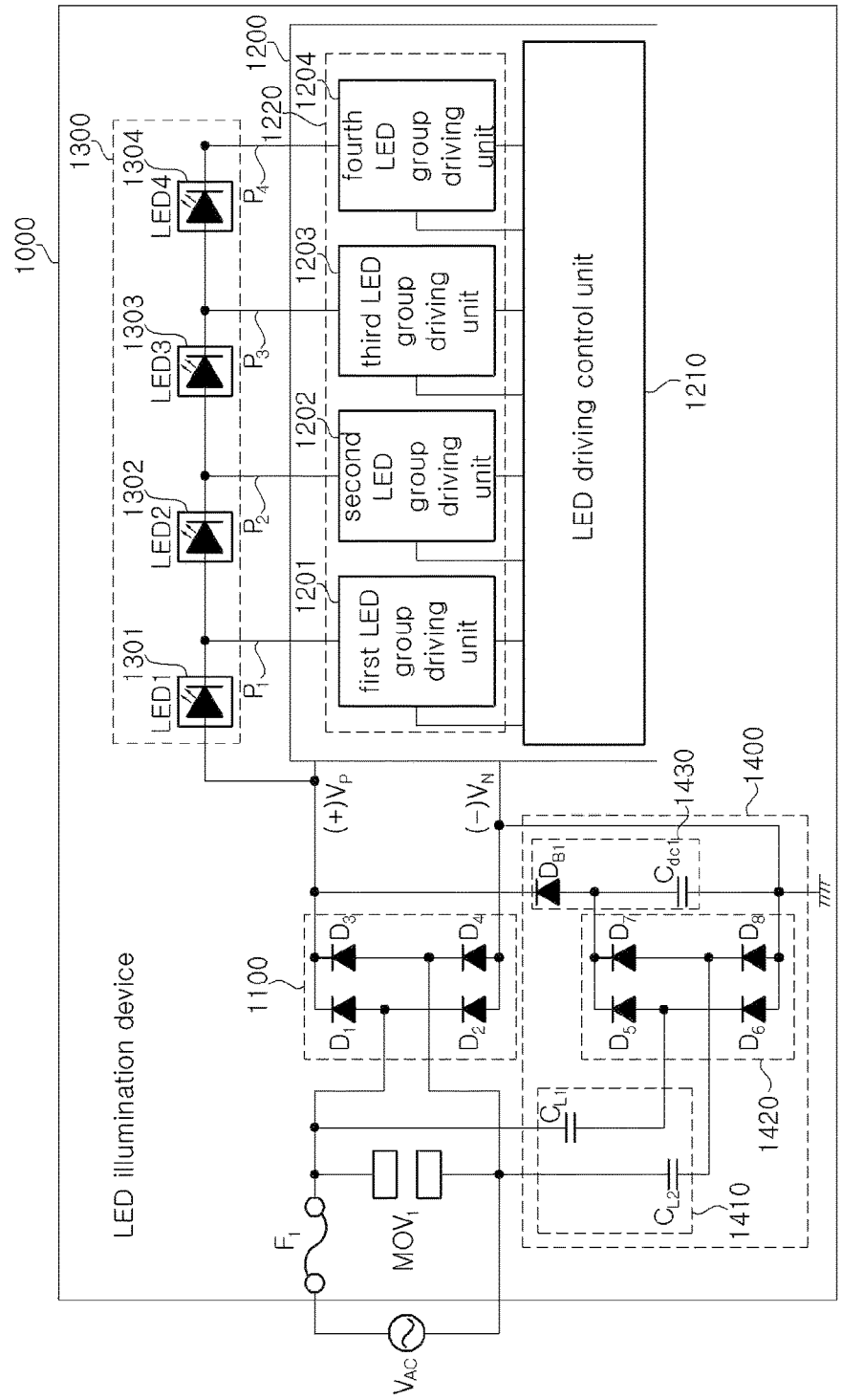
[FIG. 4]

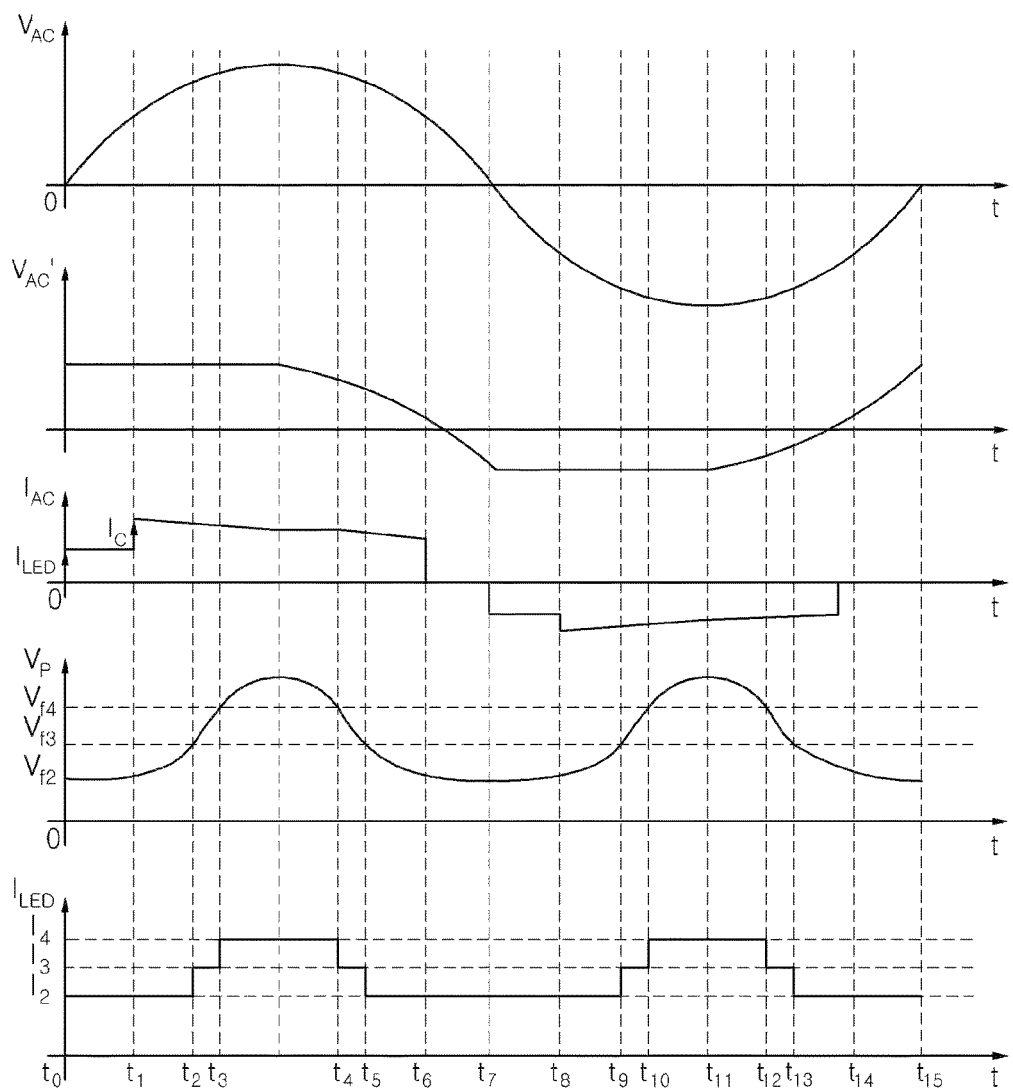
[FIG. 5A]

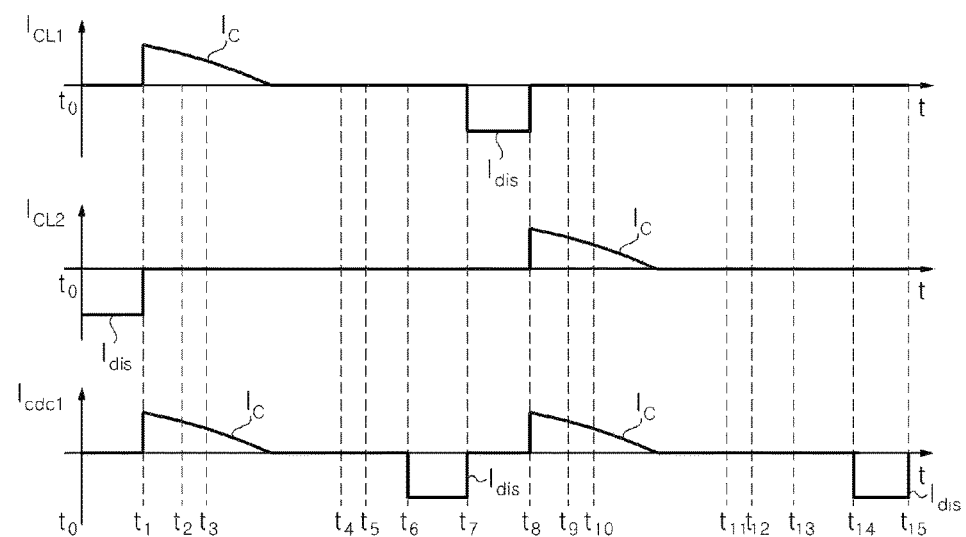
[FIG. 5B]

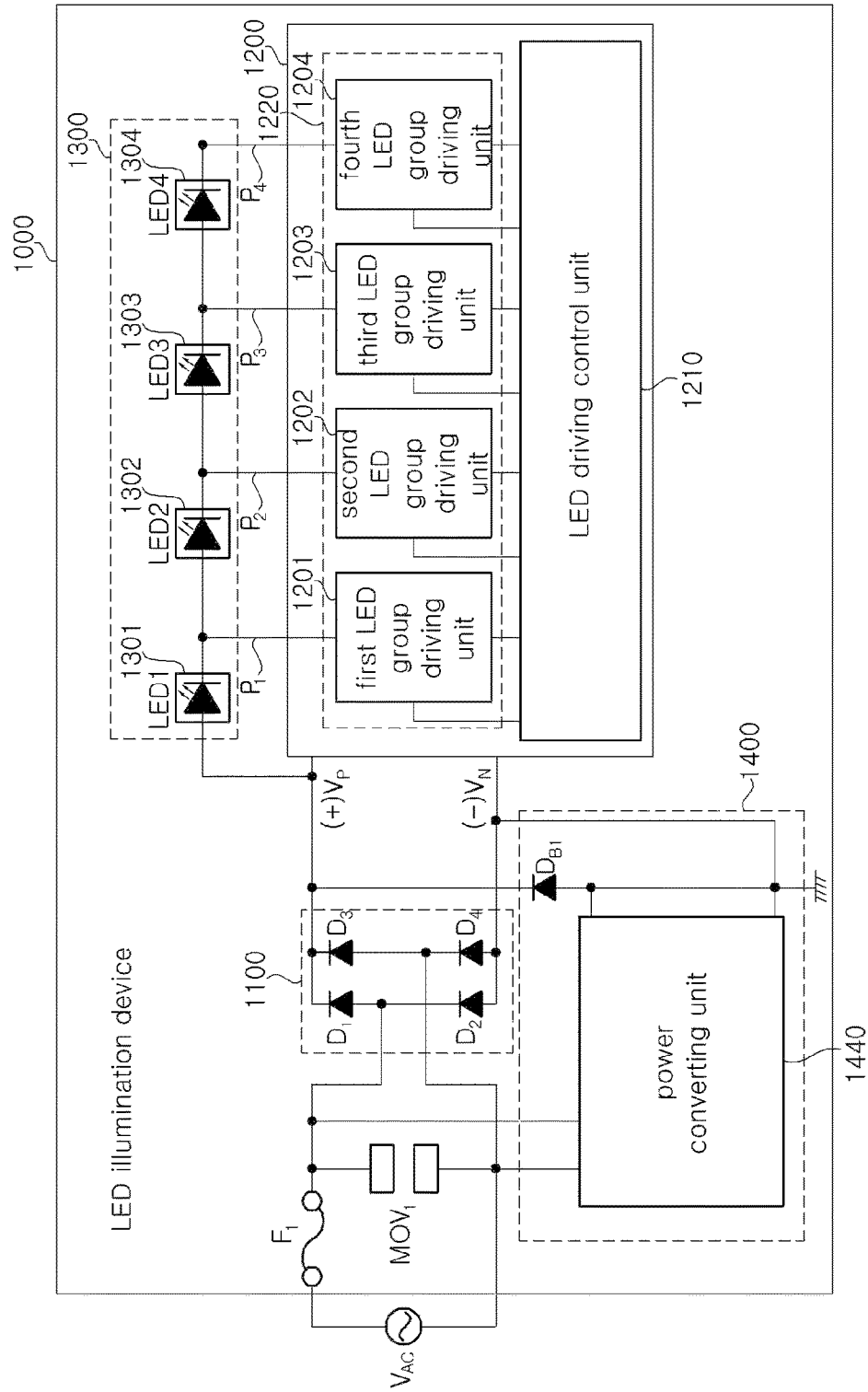
[FIG. 6]

LED DRIVING CIRCUIT USING DOUBLE BRIDGE DIODE AND LED ILLUMINATION DEVICE COMPRISING SAME

CROSS-REFERENCE TO RELATED APPLICATIONS

This application is the National Stage of International Application PCT/KR2014/002082, filed on Mar. 13, 2014, and claims priority from and the benefit of Korean Patent Application No. 10-2013-0030181, filed on Mar. 21, 2013, which are incorporated herein by reference for all purposes as if fully set forth herein.

BACKGROUND

Field

The present invention relates to a light emitting diode (LED) driving circuit using a double bridge diode and an LED illumination device including the same, and more particularly, to an LED driving circuit using a double bridge diode capable of compensating for an optical output of an LED illumination using an element and/or a circuit in which energy may be charged or from which the energy may be discharged, and an LED illumination device including the same.

Discussion of the Background

Light emitting diodes (LEDs) are generally driven in a direct current (DC) driving scheme. In the case of the DC driving scheme, an alternating current (AC) to DC converter such as a switching mode power supply (SMPS), or the like, is necessarily required. However, this power converter raises a manufacturing cost of an illumination equipment, makes it difficult to miniaturize the illumination equipment, decreases energy efficiency of the illumination equipment, and shortens a lifespan of the illumination equipment due to a short lifespan.

In order to solve these problems of the DC driving scheme, an AC driving scheme of the LEDs has been suggested (in Korean Patent Laid-Open Publication No. 10-2012-0032509, and the like). However, in the case of a circuit according to this technology, a power factor is decreased due to discordance between an input voltage and currents output from the LEDs, and a non-emissive section of the LEDs is long, such that a flicker phenomenon that a user recognizes flickering of an illumination occurs.

In order to solve the problems of the AC driving scheme of the LEDs as described above, a sequential driving scheme of AC LEDs has been suggested (in Korean Patent Laid-Open Publication No. 10-2012-0041093, and the like). According to the sequential driving scheme of the AC LEDs described above, in a situation in which an input voltage is increased over time, a first LED first starts to emit light at $V_{f1}$, a second LED connected to the first LED in series starts to emit light at $V_{f2}$, which is a voltage higher than $V_{f1}$, and a third LED connected to the second LED and the first LED in series starts to emit light at $V_{f3}$, which is a voltage higher than $V_{f2}$. In addition, in a situation in which the input voltage is decreased over time, the third LED first stops emitting the light at $V_{f3}$, the second LED stops emitting the light at $V_{f2}$, and the first LED finally stops emitting the light at $V_{f1}$, such that an LED driving current is designed so as to be approximate to the input voltage. According to the sequential driving scheme of the AC LEDs described above, an LED driving current converges in a form similar to an AC input voltage, such that a power factor is improved, but a flicker phenomenon in a non-emissive section in which an input voltage does not arrive at $V_{f1}$ still occurs, and light emitting times of each LED light emitting module are different from each other, such that optical characteristics of an illumination device are not uniform.

In order to solve the problems of the sequential driving scheme of the AC LEDs as described above, various technologies for removing the non-emissive section using a smoothing capacitor, a power factor correction circuit, and the like, have been suggested (in Korean Patent Laid-Open Publication No. 10-2010-0107196). However, according to these technologies, a total harmonic distortion (THD) is deteriorated due to element characteristics that a current is rapidly increased at a point in time at which the smoothing capacitor starts to be charged. In addition, since the smoothing capacitor should maintain a voltage of at least $V_{f3}$ or more in order to drive all the LEDs in the non-emissive section, a high capacitance is required. Further, for this reason, a cost of the smoothing capacitor is increased, and it is difficult to miniaturize an LED illumination equipment.

FIG. 1A is a block diagram illustrating a configuration of an LED illumination device including a smoothing capacitor according to the related art, and FIG. 1B is waveform diagrams for describing a voltage waveform of AC power input to the LED illumination device illustrated in FIG. 1A, a current waveform of the AC power, and a waveform of a driving voltage actually applied to an LED group. As illustrated in FIG. 1A, the LED illumination device including a smoothing capacitor according to the related art may be configured to include a rectifying module 10, an LED driving module 20, an LED module 30 including a plurality of LED groups 31 to 34, and the smoothing capacitor $C_{dc1}$. The rectifying module 10 includes a full-bridge diode formed by four diodes $D_1$ to $D_4$, and serves to full-wave-rectify an applied AC voltage $V_{AC}$ and output the full-wave-rectified voltage Vrec. The smoothing capacitor $C_{dc1}$ is charged or discharged depending on a voltage level of the rectified voltage Vrec to serve to smooth the rectified voltage Vrec. A capacitance of the smoothing capacitor $C_{dc1}$ may be variously configured as needed. In the case of the related art illustrated in FIG. 1A, an example in which a capacitance of the smoothing capacitor $C_{dc1}$ is selected so that a minimum voltage level of the smoothing capacitor $C_{dc1}$ is $V_{f3}$ or more so as to drive three LED groups 31 to 33 in the non-emissive section is illustrated. The LED driving module 20 decides a voltage level of an applied driving voltage $V_p$ and controls driving of the plurality of LED groups 31 to 34 depending on a voltage level of the driving voltage $V_p$. The LED driving module 20 may control driving of four LED groups 31 to 34. However, since the driving voltage $V_p$ input to the LED groups 31 to 34 is maintained at at least $V_{f3}$ or more due to the smoothing capacitor $C_{dc1}$ as described above, a first LED group driving unit $V_{DR1}$ and a second LED group driving unit $V_{DR2}$ each controlling driving of a first LED group 31 and a second LED group 32 are not substantially operated. The LED driving module 20 controls a third LED group driving unit $V_{DR3}$ or a fourth LED group driving unit $V_{DR4}$ depending on the voltage level of the driving voltage $V_p$ (a voltage level of a ripple voltage of the smoothing capacitor $C_{dc1}$) to perform a control so that the first to third LED groups 31 to 33 or the first to fourth LED groups 31 to 34 emit light. However, in the case of the related art as illustrated in FIG. 1A, an input current $I_{AC}$ of an AC power supply and an LED driving current are completely decoupled from each other by the smoothing capacitor $C_{dc1}$, and a light amount and power characteristics of the LED module 30 completely depend on the smoothing capacitor $C_{dc1}$. Meanwhile, as illustrated in a waveform diagram of the input current $I_{AC}$ of the AC power supply of FIG. 1B, it may be confirmed that a conduction time (that is, a charging time of the smoothing capacitor $C_{dc1}$) (time sections t1 to t3 and t5 to t7) is relatively short, and a magnitude of the input current is large (sharp). Therefore, in the case of the related art as illustrated in FIGS. 1A and 1B, the current $I_{AC}$ input from the AC power supply is not substantially used to drive the LED, and THD and power factor (PF) characteristics are significantly deteriorated, such that it is difficult to apply the related art as illustrated in FIGS. 1A and 1B to a high capacity product.

Meanwhile, in order to solve the problems of the related art as described above, an LED illumination device including a power factor correction circuit such as a valley-fill circuit has been suggested. FIG. 2A is a block diagram illustrating a configuration of an LED illumination device including a valley-fill circuit according to the related art, and FIG. 2B is waveform diagrams for describing a voltage waveform of AC power input to the LED illumination device illustrated in FIG. 2A, a current waveform of the AC power, a waveform of a driving voltage actually applied to an LED group, and an LED driving current. As illustrated in FIG. 2A, the LED illumination device including a valley-fill circuit may be configured to include a rectifying module 10, an LED driving module 20, an LED module 30 including a plurality of LED groups 31 to 34, and the valley-fill circuit 40. Since a description for the rectifying module 10, the LED driving module 20, and the LED module 30 including the plurality of LED groups 31 to 34 is the same as the description provided above with reference to FIG. 1A, a description for an overlapped content will be omitted, and the valley-fill circuit 40 will be mainly described. The valley-fill circuit 40, which is a circuit correcting a power factor, is charged or discharged depending on a voltage level of the rectified voltage Vrec to serve to compensate for the rectified voltage Vrec. Although valley-fill circuits having various capacities may be adopted and used as needed, an example in which a capacity of the valley-fill circuit 40 is selected to drive at least two LED groups 31 and 32 is illustrated in FIGS. 2A and 2B. Therefore, the driving voltage $V_p$ input to the LED groups 31 to 34 is maintained at at least $V_{f2}$ or more due the valley-fill circuit 40, the first LED group driving unit $V_{DR1}$ controlling the driving of the first LED group 31 is not substantially operated. The LED driving module 20 controls the second LED group driving unit $V_{DR2}$, the third LED group driving unit $V_{DR3}$, or the fourth LED group driving unit $V_{DR4}$ depending on a voltage level of the driving voltage $V_p$ to perform a control so that the first and second LED groups 31 and 32, the first to third LED groups 31 to 33, or the first to fourth LED groups 31 to 34 emit the light. In the case of the related art as illustrated in FIG. 2A, as illustrated in a waveform diagram of an input current $I_{AC}$ of AC power of FIG. 2B, the input current $I_{AC}$ input from an AC power supply and energy stored in capacitors $C_1$ and $C_2$ of the valley-fill circuit 40 are used together with each other in order to drive the LED module 30, such that a capacitance of the capacitor may be decreased as compared with the LED illumination device including the smoothing capacitor according to the related art. Further, in PF characteristics, a relatively high value may be maintained as compared with the LED illumination device including the smoothing capacitor according to the related art. However, as illustrated in the waveform diagram of the input current $I_{AC}$ of the AC power supply of FIG. 2B, it may be confirmed that a conduction time (that is, a charging time of the valley-fill circuit 40) (time sections t3 to t4 and t11 to t12) is relatively short, and a magnitude of the input current is large (sharp). Therefore, in the case of the related art as illustrated in FIGS. 2A and 2B, a separate current limiting circuit is required in order to improve THD characteristics, and charging of the valley-fill circuit 40 may be performed only from a point in time at which an input voltage $V_{AC}$ becomes a voltage level (that is, $V_{f4}$) at which all of the four LED groups 31 to 34 are driven to a point in time at which the input voltage $V_{AC}$ becomes a maximum.

On the other hand, in order to solve the problems of the related art as described above, a technology of controlling charging and/or discharging an energy charging or discharging unit using an active element such as a metal oxide semiconductor field effect transistor (MOSFET), or the like, has been suggested. However, in the case of this technology, charging or discharging loss is generated due to energy consumed in the active element.

SUMMARY

The present invention is to solve the problems of the related art as described above.

An object of the present invention is to provide a light emitting diode (LED) driving circuit using a double bridge diode capable of effectively removing a flicker phenomenon by removing a non-emissive section, and an LED illumination device including the same.

Another object of the present invention is to provide an LED driving circuit using a double bridge diode capable of improving both of total harmonic distortion (THD) characteristics and a power factor of an LED illumination device using a second rectifying unit generating a rectified voltage that is to be charged in an energy charging or discharging element (or circuit) for providing a second driving voltage from the same alternating current (AC) power, separately from a first rectifying module for providing a first driving voltage, and an LED illumination device including the same.

Still another object of the present invention is to provide an LED driving circuit using a double bridge diode capable of minimizing loss at the time of charging or discharging of an energy charging or discharging element (or circuit) by configuring a second driving voltage providing module providing a second driving voltage to an LED module in a compensation section using only a passive element, and an LED illumination device including the same.

Characteristic configurations of the present invention for accomplishing the objects of the present invention as described above and unique effects of the present invention to be described will be described below.

According to an aspect of the present invention, there is provided an LED driving circuit including: a first rectifying module connected to an AC power supply, full-wave-rectifying an applied AC voltage, and providing a first rectified voltage that is full-wave-rectified as a first driving voltage to an LED light emitting module; and a second driving voltage providing module connected to the AC power supply in parallel with the first rectifying module, full-wave-rectifying the applied AC voltage to generate a second rectified voltage, charging energy using the generated second rectified voltage in a charging section, and providing a second driving voltage to the LED light emitting module in a compensation section.

The second driving voltage providing module may include: a first line capacitor connected between a first output terminal of the AC power supply and a first input terminal of a second rectifying unit in series, adjusting the AC voltage applied from the AC power supply, and outputting the adjusted AC voltage to the first input terminal of the second rectifying unit; a second line capacitor connected between a second output terminal of the AC power supply and a second input terminal of the second rectifying unit in series, adjusting the AC voltage applied from the AC power supply, and outputting the adjusted AC voltage to the second input terminal of the second rectifying unit; the second rectifying unit full-wave-rectifying the adjusted AC voltages input from the first line capacitor and the second line capacitor to generate and output the second rectified voltage; and an energy charging or discharging unit connected between first and second output terminals of the second rectifying unit, charged by receiving the second rectified voltage in the charging section, and discharged in the compensation section to provide the second driving voltage.

The first line capacitor and the second line capacitor may delay a phase of the applied AC voltage and step down the applied AC voltage.

The energy charging or discharging unit may include: an energy charging or discharging element charged by receiving the second rectified voltage in the charging section and discharged in the compensation section to provide the second driving voltage; and a first rectified voltage blocking unit connected between a first output terminal of the first rectifying module and the energy charging or discharging element in series and blocking the first rectified voltage output from the first rectifying module so that the first rectified voltage is not charged in the energy charging or discharging element.

The energy charging or discharging element may be a charging or discharging capacitor.

The first rectified voltage blocking unit may be a diode.

Capacitances of the first line capacitor and the second line capacitor may be the same as each other.

The compensation section may be a section in which a voltage level of the first rectified voltage is less than $V_{f1}$.

The LED light emitting module may include first to n-th LED groups (n indicates an integer of 2 or more), and the LED driving circuit may further include an LED driving module sequentially driving the first to n-th LED groups depending on a voltage level of the first driving voltage in a non-compensation section and driving at least one of the first to n-th LED groups depending on a voltage level of the second driving voltage in the compensation section.

The compensation section may be a section in which a voltage level of the first rectified voltage is less than $V_{f2}$.

The first line capacitor or the second line capacitor may be charged by the applied AC voltage in the charging section and be discharged in a section in which the second driving voltage is not provided by the energy charging or discharging unit in the compensation section to provide the second driving voltage to the LED light emitting module through the first rectifying module.

According to another aspect of the present invention, there is provided an LED driving circuit including: a first rectifying module connected to an AC power supply, full-wave-rectifying an applied AC voltage, and providing a first rectified voltage that is full-wave-rectified as a first driving voltage to the LED light emitting module; and a second driving voltage providing module connected to the AC power supply in parallel with the first rectifying module, converting the applied AC voltage to generate a direct current (DC) voltage, and providing the generated DC voltage as a second driving voltage to the LED light emitting module in a compensation section.

The second driving voltage providing module may include: a power converting unit converting the AC voltage input from the AC power supply to generate the DC voltage; and a first rectified voltage blocking unit connected between a first output terminal of the first rectifying module and the power converting unit in series and blocking the first rectified voltage output from the first rectifying module.

The LED light emitting module may include first to n-th LED groups (n indicates an integer of 2 or more), and the LED driving circuit may further include an LED driving module sequentially driving the first to n-th LED groups depending on a voltage level of the first driving voltage in a non-compensation section and driving at least one of the first to n-th LED groups depending on a voltage level of the second driving voltage in the compensation section.

According to still another aspect of the present invention, there is provided an LED illumination device including: a first rectifying module connected to an AC power supply, full-wave-rectifying an applied AC voltage, and providing a first rectified voltage that is full-wave-rectified as a first driving voltage to an LED light emitting module; a second driving voltage providing module connected to the AC power supply in parallel with the first rectifying module, full-wave-rectifying the applied AC voltage to generate a second rectified voltage, charging energy using the generated second rectified voltage in a charging section, and providing a second driving voltage to the LED light emitting module in a compensation section; and the LED light emitting module driven by receiving the first driving voltage provided from the first rectifying module in a non-compensation section and driven by receiving the second driving voltage provided from the second driving voltage providing module in the compensation section.

The second driving voltage providing module may include: a first line capacitor connected between a first output terminal of the AC power supply and a first input terminal of a second rectifying unit in series, adjusting the AC voltage applied from the AC power supply, and outputting the adjusted AC voltage to the first input terminal of the second rectifying unit; a second line capacitor connected between a second output terminal of the AC power supply and a second input terminal of the second rectifying unit in series, adjusting the AC voltage applied from the AC power supply, and outputting the adjusted AC voltage to the second input terminal of the second rectifying unit; the second rectifying unit full-wave-rectifying the adjusted AC voltages input from the first line capacitor and the second line capacitor to generate and output the second rectified voltage; and an energy charging or discharging unit connected between first and second output terminals of the second rectifying unit, charged by receiving the second rectified voltage in the charging section, and discharged in the compensation section to provide the second driving voltage.

The first line capacitor and the second line capacitor may delay a phase of the applied AC voltage and step down the applied AC voltage.

The energy charging or discharging unit may include: an energy charging or discharging element charged by receiving the second rectified voltage in the charging section and discharged in the compensation section to provide the second driving voltage; and a first rectified voltage blocking unit connected between a first output terminal of the first rectifying module and the energy charging or discharging element in series and blocking the first rectified voltage output from the first rectifying module so that the first rectified voltage is not charged in the energy charging or discharging element.

The energy charging or discharging element may be a charging or discharging capacitor.

The first rectified voltage blocking unit may be a diode.

Capacitances of the first line capacitor and the second line capacitor may be the same as each other.

The compensation section may be a section in which a voltage level of the first rectified voltage is less than $V_{f1}$.

The LED light emitting module may include first to n-th LED groups (n indicates an integer of 2 or more), and the LED illumination device may further include an LED driving module sequentially driving the first to n-th LED groups depending on a voltage level of the first driving voltage in the non-compensation section and driving at least one of the first to n-th LED groups depending on a voltage level of the second driving voltage in the compensation section, wherein the LED light emitting module is sequentially driven depending on a control of the LED driving module by receiving the first driving voltage provided from the first rectifying module, and at least one LED group is driven depending on a control of the LED driving module by receiving the second driving voltage provided from the second driving voltage providing module in the compensation section.

The compensation section may be a section in which a voltage level of the first rectified voltage is less than $V_{f2}$.

The first line capacitor or the second line capacitor may be charged by the applied AC voltage in the charging section and be discharged in a section in which the second driving voltage is not provided by the energy charging or discharging unit in the compensation section to provide the second driving voltage to the LED light emitting module through the first rectifying module, and the LED module may be driven by receiving the second driving voltage in the section in which the second driving voltage is not provided in the compensation section.

According to yet still another aspect of the present invention, there is provided an LED illumination device including: a first rectifying module connected to an AC power supply, full-wave-rectifying an applied AC voltage, and providing a first rectified voltage that is full-wave-rectified as a first driving voltage to an LED light emitting module; a second driving voltage providing module connected to the AC power supply in parallel with the first rectifying module, converting the applied AC voltage to generate a DC voltage, and providing the generated DC voltage as a second driving voltage to the LED light emitting module in a compensation section; and the LED light emitting module driven by receiving the first driving voltage provided from the first rectifying module in a non-compensation section and driven by receiving the second driving voltage provided from the second driving voltage providing module in the compensation section.

The second driving voltage providing module may include: a power converting unit converting the AC voltage input from the AC power supply to generate the DC voltage; and a first rectified voltage blocking unit connected between a first output terminal of the first rectifying module and the power converting unit in series and blocking the first rectified voltage output from the first rectifying module.

The LED light emitting module may include first to n-th LED groups (n indicates an integer of 2 or more), and the LED illumination device may further include an LED driving module sequentially driving the first to n-th LED groups depending on a voltage level of the first driving voltage in the non-compensation section and driving at least one of the first to n-th LED groups depending on a voltage level of the second driving voltage in the compensation section, wherein the LED light emitting module is sequentially driven depending on a control of the LED driving module by receiving the first driving voltage provided from the first rectifying module, and at least one LED group is driven depending on a control of the LED driving module by receiving the second driving voltage provided from the second driving voltage providing module in the compensation section.

According to an exemplary embodiment of the present invention, a non-emissive section is removed, thereby making it possible to remove a flicker phenomenon.

In addition, according to an exemplary embodiment of the present invention, a second rectifying unit generating a rectified voltage that is to be charged in an energy charging or discharging element (or circuit) for providing a second driving voltage from the same alternating current (AC) power is used separately from a first rectifying module for providing a first driving voltage, thereby making it possible to improve both of total harmonic distortion (THD) characteristics and a power factor of an LED illumination device.

Further, according to an exemplary embodiment of the present invention, a second driving voltage providing module is configured using only a passive element, thereby making it possible to minimize loss at the time of charging or discharging of an energy charging or discharging element (or circuit).

BRIEF DESCRIPTION OF THE DRAWINGS

FIG. 1A is a block diagram illustrating a configuration of a light emitting diode (LED) illumination device including a smoothing capacitor according to the related art.

FIG. 1B is waveform diagrams for describing a voltage waveform of alternating current (AC) power input to the LED illumination device illustrated in FIG. 1A, a current waveform of the AC power, and a waveform of a driving voltage actually applied to an LED group.

FIG. 2A is a block diagram illustrating a configuration of an LED illumination device including a valley-fill circuit according to the related art.

FIG. 2B is waveform diagrams for describing a voltage waveform of AC power input to the LED illumination device illustrated in FIG. 2A, a current waveform of the AC power, a waveform of a driving voltage actually applied to an LED group, and an LED driving current.

FIG. 3 is a block diagram illustrating a schematic configuration of an LED illumination device according to an exemplary embodiment of the present invention.

FIG. 4 is a block diagram illustrating a detailed configuration of the LED illumination device according to an exemplary embodiment of the present invention.

FIG. 5A is waveform diagrams for describing an AC voltage input to a first rectifying module, an adjusted AC voltage input to a second rectifying unit, an AC current input from an AC power supply, a driving voltage applied to an LED module, and an LED driving current in an LED illumination device configured to perform compensation for a second forward voltage level according to an exemplary embodiment of the present invention.

FIG. 5B is waveform diagrams for describing charged/discharged currents of first and second line capacitors and charged/discharged currents of an energy charging or discharging element in the LED illumination device configured to perform compensation for a second forward voltage level according to an exemplary embodiment of the present invention.

FIG. 6 is a block diagram illustrating a detailed configuration of an LED illumination device according to another exemplary embodiment of the present invention.

DETAILED DESCRIPTION OF THE ILLUSTRATED EMBODIMENTS

Exemplary embodiments of the present invention will be described in detail with reference to the accompanying drawings. These exemplary embodiments will be described in detail for those skilled in the art in order to practice the present invention. It should be appreciated that various exemplary embodiments of the present invention are different from each other, but do not have to be exclusive. For example, specific shapes, structures, and characteristics described in the present specification may be implemented in another exemplary embodiment without departing from the spirit and the scope of the present invention in connection with an exemplary embodiment. In addition, it should be understood that a position or an arrangement of individual components in each disclosed exemplary embodiment may be changed without departing from the spirit and the scope of the present invention. Therefore, a detailed description described below should not be construed as being restrictive. In addition, the scope of the present invention is defined only by the accompanying claims and their equivalents if being appropriate described. Similar reference numerals will be used to describe the same or similar functions throughout the accompanying drawings.

Hereinafter, exemplary embodiments of the present invention will be described in detail with reference to the accompanying drawings so that those skilled in the art to which the present invention pertains may easily practice the present invention.

Exemplary Embodiment of the Present Invention

In an exemplary embodiment of the present invention, a term 'light emitting diode (LED) group' means a set of LEDs in which a plurality of LEDs (or a plurality of light emitting cells) are connected to each other in series, in parallel, or in series and parallel, such that operations of the plurality of LEDs are controlled in one unit depending on a control of an LED driving module (that is, the plurality of LEDs are turned on/off together with each other).

Further, a term 'first forward voltage level $V_{f1}$' means a threshold voltage level that may drive a first LED group, a term 'second forward voltage level $V_{f2}$' means a threshold voltage level that may drive first and second LED groups connected to each other in series, and a term 'third forward voltage level $V_{f3}$' means a threshold voltage level that may drive first to third LED groups connected to each other in series. That is, 'an n-th forward voltage level $V_{fn}$' means a threshold voltage level that may drive first to n-th LED groups connected to each other in series.

In addition, a term 'LED driving module' means a module receiving an alternating current (AC) voltage to drive and control the LEDs, and although an exemplary embodiment in which the driving of the LEDs is controlled using a rectified voltage will be mainly described in the present specification, the present invention is not limited thereto, but should be generally and widely interpreted.

Further, a term 'sequential driving scheme' means a driving scheme in which a plurality of LED groups sequentially emit light depending on an increase in an applied input voltage and are sequentially turned off depending on a decrease in an applied input voltage, in the LED driving module receiving an input voltage of which a magnitude is changed over time to drive the LEDs.

In addition, a term 'first driving voltage' means an input voltage itself or a driving voltage generated by constantly processing the input voltage (for example, processing the input voltage through a process such as a rectifying circuit, or the like) and primarily supplied to the LED groups. Further, a term 'second driving voltage' means a driving voltage secondarily supplied from an energy storing element in which an input voltage is stored to the LED groups. The second driving voltage may be a driving voltage supplied from a charged capacitor in which the input voltage is stored to the LED groups by way of example. Therefore, a term 'driving voltage' is interpreted as including the first driving voltage and/or the second driving voltage supplied to the LED groups, except for the case in which it is called the 'first driving voltage' or the 'second driving voltage'.

In addition, a term 'compensation section', which is a section in which a voltage level of an input voltage (rectified voltage) is less than a preset forward voltage level in the sequential driving scheme, means a section in which a driving current is not supplied to the LED group. For example, a first forward voltage level $V_{f1}$ compensation section means a section in which the voltage level of the rectified voltage is less than $V_{f1}$. In this case, the compensation section becomes a non-emissive section. In addition, a second forward voltage level $V_{f2}$ compensation section means a section in which the voltage level of the rectified voltage is less than $V_{f2}$. Therefore, an n-th forward voltage level $V_{fn}$ compensation section means a section in which the voltage level of the rectified voltage is less than $V_{fn}$. In addition, a term 'first forward voltage level $V_{f1}$ compensation' means supplying a driving current to the LED group by supplying the second driving voltage to the LED group in the first forward voltage level $V_{f1}$ compensation section, and a term 'second forward voltage level $V_{f2}$ compensation' means supplying the second driving voltage to the LED group in the second forward voltage level $V_{f2}$ compensation section. Therefore, a term 'n-th forward voltage level $V_{fn}$ compensation' means supplying the second driving voltage to the LED group in the n-th forward voltage level $V_{fn}$ compensation section.

In addition, a term 'non-compensation section' (or 'normal operation section'), which is a section in which the voltage level of the input voltage (rectified voltage) is the preset forward voltage level or more in the sequential driving scheme, means a section in which the input voltage (first driving voltage) is supplied to the LED group to allow the LED group (groups) to emit light. As an example, a 'non-compensation section' (or a 'normal operation section') in an exemplary embodiment in which the first forward voltage level $V_{f1}$ compensation is performed means a section in which the voltage level of the input voltage is $V_{f1}$ or more, and a 'non-compensation section' (or a 'normal operation section') in an exemplary embodiment in which the second forward voltage level $V_{f2}$ compensation is performed means a section in which the voltage level of the input voltage is $V_{f2}$ or more. Therefore, a 'non-compensation section' (or a 'normal operation section') in an exemplary embodiment in which the n-th forward voltage level $V_{fn}$ compensation is performed means a section in which the voltage level of the input voltage is $V_{fn}$ or more.

In addition, a term 'LED group voltage level' means a voltage level applied across both ends of a specific LED group. For example, a first LED group voltage level means a voltage level applied across both ends of the first LED group, and a second LED group voltage level means a voltage level applied across both ends of the second LED group. Therefore, an 'n-th LED group voltage level' means a voltage level applied across both ends of the n-th LED group.

Further, terms such as V1, V2, V3, . . . , t1, t2, . . . , T1, T2, T3, and the like, used in order to represent any specific voltage, specific point in time, specific temperature, and the like, in the present disclosure are not used in order to represent absolute values, but are relative values used in order to be distinguished from each other.

Summary of LED Illumination Device

FIG. 3 is a block diagram illustrating a schematic configuration of an LED illumination device according to an exemplary embodiment of the present invention. Hereinafter, a configuration and a function of an LED illumination device 1000 according to an exemplary embodiment of the present invention will be schematically described with reference to FIG. 3.

First, the LED illumination device 1000 according to an exemplary embodiment of the present invention may be configured to include a first rectifying module (i.e., first rectifying unit) 1100, an LED driving circuit 1500 including an LED driving module 1200 and a second driving voltage providing module 1400, and an LED light emitting module 1300 driven depending on a control of the LED driving circuit.

The LED driving circuit 1500 receives an AC voltage $V_{AC}$ from an AC power supply and rectifies the received AC voltage to generate a first rectified voltage Vrec1. In addition, the LED driving circuit 1500 is configured to provide the generated first rectified voltage Vrec1 as a first driving voltage to the LED light emitting module 1300 to control driving of the LED light emitting module 1300. For the purpose of illustration and for the purpose of clear understanding, hereinafter, an exemplary embodiment in which the LED driving circuit 1500 according to the present invention rectifies an input AC voltage $V_{AC}$ and then controls driving of the LED light emitting module 1300 using a generated rectified voltage will be described. Therefore, in this exemplary embodiment, the first driving voltage is the first rectified voltage Vrec1. However, it is to be noted that the LED driving circuit 1500 according to the present invention is not limited to using the first rectified voltage Vrec1, but may be applied to various cases in which the sequential driving scheme may be adopted, that is, a magnitude of an input voltage is changed over time. For example, the LED driving circuit 1500 according to the present invention may also be used to drive AC LEDs (for example, LEDs in which LED groups are disposed in reverse parallel) that may be sequentially driven by directly receiving the AC voltage $V_{AC}$ applied thereto.

In addition, the LED driving circuit 1500 according to the present invention is configured to receive the AC voltage $V_{AC}$ from the AC power supply, rectify the received AC voltage to generate a second rectified voltage Vrec2, charge energy using the generated second rectified voltage Vrec2 during the non-compensation section as described above, and supply the stored energy as a second driving voltage to the LED light emitting module 1300 during the compensation section as described above. Due to the above-mentioned configuration, the LED driving circuit 1500 according to the present invention removes a non-emissive section of the LED light emitting module 1300, thereby making it possible to improve a flicker phenomenon.

In order to perform the function as described above, the LED illumination device 1000 according to an exemplary embodiment of the present invention may include the first rectifying module 1100, the LED driving module 1200, the second driving voltage providing module 1400, and the LED light emitting module 1300, as illustrated in FIG. 3.

First, the LED light emitting module 1300 may include a plurality of LED groups. The plurality of LED groups included in the LED light emitting module 1300 may sequentially emit light and be sequentially turned off depending on a control of the LED driving module 1200 in the non-compensation section. Although the LED light-emitting module 1300 including a first LED group 1301, a second LED group 1302, a third LED group 1303, and a fourth LED group 1304 is illustrated in FIGS. 3 and 4, it will be obvious to those skilled in the art that the number of LED groups included in the LED light emitting module 1300 may be variously modified as needed.

Meanwhile, according to another exemplary embodiment, the first LED group 1301, the second LED group 1302, the third LED group 1303, and the fourth LED group 1304 may also have different forward voltage levels, respectively. For example, in the case in which the first LED group 1301, the second LED group 1302, the third LED group 1303, and the fourth LED group 1304 include different numbers of LED elements, respectively, the first LED group 1301, the second LED group 1302, the third LED group 1303, and the fourth LED group 1304 will have different forward voltage levels.

The first rectifying module 1100 according to the present invention is configured to rectify the AC voltage $V_{AC}$ input from an external power supply to generate and output the first rectified voltage Vrec1. As the first rectifying module 1100, one of various known rectifying circuits such as a full-wave rectifying circuit, a half-wave rectifying circuit, and the like, may be used. The first rectified voltage Vrec1 output from the first rectifying module 1100 is output to the LED light emitting module 1300 and the LED driving module 1200. A bridge full-wave rectifying circuit including four diodes $D_1$ to $D_4$ is illustrated in FIGS. 3 and 4.

The LED driving module 1200 according to the present invention decides a voltage level of an input driving voltage (the first driving voltage (first rectified voltage Vrec1) in the non-compensation section or the second driving voltage in the compensation section) and determines a magnitude, a providing point in time, and a blocking point in time of an LED driving signal that is to be provided to the LED light emitting module 1300 (more specifically, each of the plurality of LED groups 1301 to 1304 included in the LED light emitting module 1300) depending on a decided magnitude of the driving voltage. In addition, the LED driving module 1200 is configured to provide the LED driving signal having the determined magnitude to one LED group or the plurality of LED groups (one or more 1301 to 1304) at the determined providing point in time of the LED driving signal and stop providing the LED driving signal to one LED group or the plurality of LED groups (one or more 1301 to 1304) at the determined blocking point in time of the LED driving signal to control the driving of the LED light emitting module 1300. A detailed configuration and function of the LED driving module 1200 according to the present invention will be described below with reference to FIG. 4.

The second driving voltage providing module 1400 according to the present invention is connected to the AC power supply in parallel with the first rectifying module 1100, and is configured to full-wave-rectify the AC voltage applied from the AC power supply to generate the second rectified voltage Vrec2, store energy using the generated second rectified voltage Vrec2 in a charging section, and provide the stored energy as the second driving voltage to the LED light emitting module 1300 in the compensation section. A detailed configuration and function of the second driving voltage providing module 1400 according to the present invention will be described below with reference to FIG. 4.

Configuration and Function of LED Driving Module

FIG. 4 is a block diagram illustrating a detailed configuration of the LED illumination device according to an exemplary embodiment of the present invention. Hereinafter, a detailed configuration and function of the LED illumination device 1000 according to an exemplary embodiment of the present invention will be described with reference to FIG. 4.

LED Driving Control Function

As illustrated in FIG. 4, the LED driving module 1200 according to the present invention may include a plurality of LED group driving units 1220 and an LED driving control unit 1210 in order to drive and control the LED groups 1301 to 1304.

First, the LED driving control unit 1210 is configured to decide a magnitude of the input driving voltage (the first driving voltage input from the first rectifying module 1100 in the non-compensation section or the second driving voltage input from the second driving voltage providing module 1400 in the compensation section) and determine a magnitude, a providing point in time, and a blocking point in time of an LED driving signal that is to be provided to each of the LED groups 1301 to 1304 depending on the magnitude of the driving voltage. In addition, the LED driving control unit 1210 is configure to control the LED group driving units 1220 at the determined providing point in time of the LED driving signal for each of the LED groups to provide the LED driving signal to a corresponding LED group (groups), thereby turning on the corresponding LED group (groups), and control the LED group driving units 1220 at the determined blocking point in time of the LED driving signal for each of the LED groups to block the provision of the LED driving signal to a corresponding LED group (groups), thereby turning off the corresponding LED group (groups).

The plurality of LED group driving units 1220 correspond to the plurality of LED groups 1301 to 1304 in a one-to-one scheme, and serve to provide the LED driving signal to each of the plurality of LED groups 1301 to 1304 or block the provision of the LED driving signal to each of the plurality of LED groups 1301 to 1304 depending on a control of the LED driving control unit 1210. In more detail, as illustrated in FIG. 4, a first LED group driving unit 1201 is connected to the first LED group 1301 and is configured to provide the LED driving signal to the first LED group 1301 or block the provision of the LED driving signal to the first LED group 1301 depending on a control of the LED driving control unit 1210. Similarly, second and third LED group driving units 1202 and 1203 are connected to the second and third LED groups 1302 and 1303, respectively, and are configured to provide the LED driving signal to the corresponding LED groups or block the provision of the LED driving signal to the corresponding LED groups. In addition, likewise, a fourth LED group driving unit 1204 is connected to the fourth LED group 1304 and is configured to provide the LED driving signal to the fourth LED group 1304 or block the provision of the LED driving signal to the fourth LED group 1304 depending on a control of the LED driving control unit 1210.

The LED group driving units 1201 to 1204 as described above may be implemented using an electronic switching element such as a bipolar junction transistor (BJT), a field effect transistor (FET), or the like, of which a kind is not limited. In the case in which the LED group driving units 1201 to 1204 are implemented using the electronic switching element, the LED driving control unit 1210 controls turn-on and turn-off of each of the LED group driving units 1201 to 1204 using a control signal having a pulse form, thereby controlling providing and blocking of the LED driving signal to a specific LED group.

Meanwhile, more preferably, the LED group driving units 1201 to 1204 according to the present invention are configured to control turn-on/off of paths $P_1$ to $P_4$ depending on a control of the LED driving control unit 1210 and at the same time, perform a constant current control function. In order to perform the above-mentioned constant current control function, each of the LED group driving units 1201 to 1204 according to the present invention may include a constant current control unit (not illustrated). The constant current control unit may be implemented using various known technologies. For example, the constant current control unit according to the present invention may include a sensing resistor for detecting a current, a differential amplifier for comparing a reference current value and a currently detected current value with each other, and a switching element configured to control connection of a path depending on an output of the differential amplifier and control an LED driving current value flowing through the path to be a constant current in the case in which the path is connected.

In more detail, in a section in which a voltage level of the driving voltage $V_p$ is the first forward voltage level $V_{f1}$ or more and is less than the second forward voltage level $V_{f2}$, the first LED group driving unit 1201 is turned on depending on a control of the LED driving control unit 1210, such that a first current path $P_1$ is connected. Therefore, a first LED driving current $I_{LED1}$ flows through the first current path $P_1$. The first LED group driving unit 1201 detects the first LED driving signal (driving current) $I_{LED1}$ and performs a constant current control function so that the first LED driving signal $I_{LED1}$ may be maintained as a first reference current $I_{REF1}$.

Similarly, in a section in which the voltage level of the driving voltage $V_p$ is the second forward voltage level $V_{f2}$ or more and is less than the third forward voltage level $V_{f3}$, the first LED group driving unit 1201 is turned off and the second LED group driving unit 1202 is turned on, depending on a control of the LED driving control unit 1210, such that a second current path $P_2$ is connected. Therefore, a second LED driving current $I_{LED2}$ flows through the second current path $P_2$. The second LED group driving unit 1202 detects the second LED driving signal (driving current) $I_{LED2}$ and performs a constant current control function so that the second LED driving signal $I_{LED2}$ may be maintained as a second reference current $I_{REF2}$.

In addition, in a section in which the voltage level of the driving voltage $V_p$ is the third forward voltage level $V_{f3}$ or more and is less than the fourth forward voltage level $V_{f4}$, the second LED group driving unit 1202 is turned off and the third LED group driving unit 1203 is turned on, depending on a control of the LED driving control unit 1210, such that a third current path $P_3$ is connected. Therefore, a third LED driving current $I_{LED3}$ flows through the third current path $P_3$. The third LED group driving unit 1203 detects the third LED driving signal (driving current) $I_{LED3}$ and performs a constant current control function so that the third LED driving signal $I_{LED3}$ may be maintained as a third reference current $I_{REF3}$.

Finally, in a section in which the voltage level of the driving voltage $V_p$ is the fourth forward voltage level $V_{f4}$ or more, the third LED group driving unit 1203 is turned off and the fourth LED group driving unit 1204 is turned on, depending on a control of the LED driving control unit 1210, such that a fourth current path $P_4$ is connected. Therefore, a fourth LED driving current $I_{LED4}$ flows through the fourth current path $P_4$. The fourth LED group driving unit 1204 detects the fourth LED driving signal (driving current) $I_{LED4}$ and performs a constant current control function so that the fourth LED driving signal $I_{LED4}$ may be maintained as a fourth reference current $I_{REF4}$.

Meanwhile, the LED driving circuit 1500 according to the present invention may be configured to approximate the first to fourth LED driving currents $I_{LED1}$ to $I_{LED4}$ to a sine waveform by setting values of the first reference current $I_{REF1}$, the second reference current $I_{REF2}$, the third reference current $I_{REF3}$, and the fourth reference current $I_{REF4}$ to be different from each other so that a waveform of the LED driving current may be approximated to a waveform of the rectified voltage in order to improve power factor (PF) and total harmonic distortion (THD) characteristics. For example, the fourth LED group driving unit 1204 may be operated by receiving a fourth driving control signal (for example, 4V) applied thereto and may be configured to control the fourth LED driving current $I_{LED4}$ to be a constant current of 100 mA. In addition, the third LED group driving unit 1203 may be operated by receiving a third driving control signal (for example, 3V) applied thereto and may be configured to control the third LED driving current $I_{LED3}$ to be a constant current of any one value of 80 mA to 95 mA, which are 80% to 95% of the fourth LED driving current $I_{LED4}$. Similarly, the second LED group driving unit 1202 may be operated by receiving a second driving control signal (for example, 2V) applied thereto and may be configured to control the second LED driving current $I_{LED2}$ to be a constant current of any one value of 65 mA to 80 mA, which are 65% to 80% of the fourth LED driving current $I_{LED4}$. In addition, the first LED group driving unit 1201 may be operated by receiving a first driving control signal (for example, 1V) applied thereto and may be configured to control the first LED driving current $I_{LED1}$ to be a constant current of any one value of 30 mA to 65 mA, which are 30% to 65% of the fourth LED driving current $I_{LED4}$.

Configuration and Function of Second Driving Voltage Providing Module According to First Exemplary Embodiment Hereinafter, a configuration and a function of the second driving voltage providing module 1400 according to the present invention will be described with reference to FIG. 4. As illustrated in FIG. 4, the second driving voltage providing module 1400 according to the present invention may include a first line capacitor $C_{L1}$, a second line capacitor $C_{L2}$, a second rectifying unit 1420, and an energy charging or discharging unit 1430.

The most significant feature of the second driving voltage providing module 1400 according to the present invention distinguished from the related art is that the second driving voltage providing module 1400 includes a separate second rectifying unit 1420 full-wave-rectifying the AC voltage $V_{AC}$ input from the AC power supply to generate the second rectified voltage Vrec2. That is, the present invention is configured to improve both of the PF and THD characteristics by separating the first rectifying module 1100 supplying the first rectified voltage Vrec1 as the first driving voltage to the LED light emitting module 1300 and the second rectifying unit 1420 supplying the second rectified voltage Vrec2 to the energy charging or discharging unit 1430 from each other.

The first line capacitor $C_{L1}$ and the second line capacitor $C_{L2}$ are positioned between the AC power supply and the second rectifying unit 1420 to separate AC power and DC power for charging (the second rectified voltage Vrec2) from each other. More preferably, the first line capacitor $C_{L1}$ is connected between a first output terminal of the AC power supply and a first input terminal of the second rectifying unit in series, and the second line capacitor $C_{L2}$ is connected between a second output terminal of the AC power supply and a second input terminal of the second rectifying unit in series.

In addition, the first line capacitor $C_{L1}$ and the second line capacitor $C_{L2}$ serve to adjust the AC voltage $V_{AC}$ of the AC power and output the adjusted AC voltage $V_{AC}'$ to the second rectifying unit 1420. In more detail, the first line capacitor $C_{L1}$ and the second line capacitor $C_{L2}$ are configured to decrease a magnitude of the AC voltage $V_{AC}$ of the AC power and delay a phase of the AC voltage $V_{AC}$ of the AC power to adjust the applied AC voltage $V_{AC}$ and output the adjusted AC voltage $V_{AC}'$ to the second rectifying unit 1420. Briefly referring to FIG. 5A, a waveform of the AC voltage $V_{AC}$ of the AC power applied to the first rectifying module 1100, the first line capacitor $C_{L1}$, and the second line capacitor $C_{L2}$ is illustrated at the uppermost end of FIG. 5A, and a waveform of the adjusted AC voltage $V_{AC}'$ having a magnitude decreased and a phase delayed by the first line capacitor $C_{L1}$ and the second line capacitor $C_{L2}$ and input the second rectifying unit 1420 is illustrated below the uppermost end of FIG. 5A. It may be confirmed through two drawings that the phase and the magnitude of the applied AC voltage $V_{AC}$ are adjusted by the first line capacitor $C_{L1}$ and the second line capacitor $C_{L2}$.

In addition, the first line capacitor $C_{L1}$ and the second line capacitor $C_{L2}$ serve to divide a voltage in a relationship with a charging or discharging capacitor $C_{dc1}$. That is, a charged voltage of the charging or discharging capacitor $C_{dc1}$ is basically determined in an impedance relationship between the first and second line capacitors $C_{L1}$ and $C_{L2}$ and the charging or discharging capacitor $C_{dc1}$, and may be determined by forward voltages and LED driving currents of the LED groups in a relationship with the LED driving module 1200. That is, a capacitance of the charging or discharging capacitor $C_{dc1}$ may be determined depending on a kind and the number of LED groups that are to be driven using the second driving voltage and a length of the compensation section. As described above, the 'compensation section' means a section in which the voltage level of the first driving voltage is less than the preset forward voltage level in the sequential driving scheme. The capacitance of the charging or discharging capacitor $C_{dc1}$ may be determined based on the sum of forward voltage levels of the LED groups to which the second driving voltage needs to be supplied in this compensation section. As an example, in the case in which the charging or discharging capacitor $C_{dc1}$ needs to supply the second driving voltage to the first LED group 1301 in the compensation section (that is, the charging or discharging capacitor $C_{dc1}$ is configured to perform compensation for the first forward voltage level $V_{f1}$), the capacitance of the charging or discharging capacitor $C_{dc1}$ needs to be determined so that a minimum value of a voltage of the charging or discharging capacitor $C_{dc1}$ in operation becomes $V_{f1}$. In this case, the charging or discharging capacitor $C_{dc1}$ is charged in a section in which the voltage level of the first driving voltage is $V_{f1}$ or more and is discharged in a section in which the voltage level of the first driving voltage is less than $V_{f1}$ to supply the second driving voltage. As another example, in the case in which the charging or discharging capacitor $C_{dc1}$ needs to supply the second driving voltage to the first LED group 1301 and the second LED group 1302 in the compensation section (that is, the charging or discharging capacitor $C_{dc1}$ is configured to perform compensation for the second forward voltage level $V_{f2}$), the capacitance of the charging or discharging capacitor $C_{dc1}$ needs to be determined so that a minimum value of a voltage of the charging or discharging capacitor $C_{dc1}$ in operation becomes $V_{f2}$. In this case, the charging or discharging capacitor $C_{dc1}$ is charged in a section in which the voltage level of the first driving voltage is $V_{f2}$ or more and is discharged in a section in which the voltage level of the first driving voltage is less than $V_{f2}$ to supply the second driving voltage. Hereinafter, an exemplary embodiment in which the charging or discharging capacitor $C_{dc1}$ is configured to perform compensation for the second forward voltage level $V_{f2}$ will be described for understanding and convenience of explanation. However, the present invention is not limited thereto, but may be variously modified and altered within the scope of the present invention.

Meanwhile, the first line capacitor $C_{L1}$ and the second line capacitor $C_{L2}$ may also perform a function of a capacitor, that is, a charging or discharging function. Therefore, the first line capacitor $C_{L1}$ and the second line capacitor $C_{L2}$ may be configured to be charged by the input AC voltage and be discharged in a section in which the second driving voltage is not provided by the charging or discharging capacitor $C_{dc1}$ in the compensation section to provide the second driving voltage to the LED light emitting module 1300 through the first rectifying module 1100. Referring to FIG. 5B, a waveform of a charged current and a discharged current of the first line capacitor $C_{L1}$ is illustrated at the uppermost end of FIG. 5B, a waveform of a charged current and a discharged current of the second line capacitor $C_{L2}$ is illustrated below the uppermost end of FIG. 5B, and a waveform of a charged current and a discharged current of the charging or discharging capacitor $C_{dc1}$ is illustrated at the lowermost end of FIG. 5B. Referring to FIG. 5B, it may be confirmed that the first line capacitor $C_{L1}$ is configured to be charged by a charged current $I_C$ applied thereto during a positive half period of the AC power and discharge a discharged current $I_{dis}$ from a point in time $t_7$ at which discharging of the charging or discharging capacitor $C_{dc1}$ ends to a point in time $t_8$ at which the charged current $I_C$ is applied in the compensation section (the charging or discharging capacitor $C_{dc1}$ is configured to perform the compensation for the second forward voltage level $V_{f2}$ in the case of an exemplary embodiment illustrated in FIGS. 5A and 5B) of a negative half period of the AC power, thereby providing the second driving voltage to the LED light emitting module 1300. A current discharged from the first line capacitor $C_{L1}$ is input to the LED light emitting module 1300 through a diode $D_1$ of the first rectifying module 1100. Similarly, referring to FIG. 5B, it may be confirmed that the second line capacitor $C_{L2}$ is configured to be charged by a charged current $I_C$ applied thereto during the negative half period of the AC power and discharge a discharged current $I_{dis}$ from a point in time $t_0$ at which discharging of the charging or discharging capacitor $C_{dc1}$ ends to a point in time $t_1$ at which the charged current $I_C$ is applied in the compensation section (that is, the section in which the first driving voltage is less than $V_{f2}$) of the positive half period of the AC power, thereby providing the second driving voltage to the LED light emitting module 1300. A current discharged from the second line capacitor $C_{L2}$ is input to the LED light emitting module 1300 through a diode $D_3$ of the first rectifying module 1100. Therefore, since the first line capacitor $C_{L1}$ and the second line capacitor $C_{L2}$ are configured to supply the second driving voltage to the LED light emitting module 1300 in a predetermined section, the capacitance of the charging or discharging capacitor $C_{dc1}$ needs to be determined in consideration of capacitances of the first line capacitor $C_{L1}$ and the second line capacitor $C_{L2}$.

In this case, a capacitance of the charging or discharging capacitor $C_{dc1}$ required in order to perform the compensation for the second forward voltage level $V_{f2}$ is decreased. A detailed description of charging or discharging of the charging or discharging capacitor $C_{dc1}$, the first line capacitor $C_{L1}$, and the second line capacitor $C_{L2}$ will be provided below with reference to FIGS. 5A and 5B. In addition, the first line capacitor $C_{L1}$ and the second line capacitor $C_{L2}$ as described above may be preferably implemented using a film capacitor or a multilayer ceramic capacitor (MLCC), and the charging or discharging capacitor $C_{dc1}$ may be implemented using an electrolytic capacitor, a film capacitor, or a multilayer ceramic capacitor (MLCC).

Meanwhile, the second rectifying unit 1420, which is a full-bridge diode rectifying unit including four diodes $D_5$ to $D_8$, is configured to receive and full-wave-rectify the AC voltage $V_{AC}'$ of which the phase and the magnitude are adjusted by the first line capacitor $C_{L1}$ and the second line capacitor $C_{L2}$ to generate and output the second rectified voltage Vrec2. Since a configuration and a function of the second rectifying unit 1420 are the same as those of the first rectifying module 1100 described above, a further detailed description for the second rectifying unit 1420 will be omitted.

The energy charging or discharging unit 1430 is connected between first and second output terminals of the second rectifying unit 1420, and is configured to be charged by receiving the second rectified voltage Vrec2 output from the second rectifying unit 1420 in the charging section and be discharged in the compensation section to provide the second driving voltage. More preferably, the energy charging or discharging unit 1430 according to the present invention may include an energy charging or discharging element $C_{dc1}$ and a first rectified voltage blocking unit $D_{B1}$. Although an exemplary embodiment in which the energy charging or discharging element is implemented by the charging or discharging capacitor $C_{dc1}$ has been illustrated in FIG. 4, the energy charging or discharging unit 1430 according to the present invention is not limited to a capacitor. That is, various elements or circuits having an energy charging or discharging function may be used as the energy charging or discharging unit 1430 according to the present invention. The first rectified voltage blocking unit $D_{B1}$ is connected between a first output terminal of the first rectifying module 1100 and the charging or discharging capacitor in series, and serves to block the first rectified voltage Vrec1 output from the first rectifying module 1100 so that the first rectified voltage Vrec1 is not charged in the charging or discharging capacitor. That is, the first rectified voltage blocking unit $D_{B1}$ serves to prevent a current flowing by the first rectified voltage Vref1 from being applied to the charging or discharging capacitor $C_{dc1}$. The first rectified voltage blocking unit $D_{B1}$ may be implemented using a capacitor.

Example of LED Driving Control of LED Illumination Device

FIG. 5A is waveform diagrams for describing the AC voltage $V_{AC}$ input to the first rectifying module 1100, the adjusted AC voltage $V_{AC}'$ input to the second rectifying unit 1420, the AC current $I_{AC}$ input from the AC power supply, the driving voltage $V_P$ applied to the LED module, and the LED driving current $I_{LED}$ in an LED illumination device configured to perform the compensation for the second forward voltage level $V_{f2}$ according to an exemplary embodiment of the present invention. In addition, FIG. 5B is waveform diagrams for describing the charged/discharged currents of the first and second line capacitors $C_{L1}$ and $C_{L2}$ and the charged/discharged currents of the charging or discharging capacitor $C_{dc1}$ in the LED illumination device configured to perform compensation for a second forward voltage level according to an exemplary embodiment of the present invention.

A waveform of the AC voltage $V_{AC}$ of the AC power applied to the LED illumination device 1000 in one period is illustrated at the uppermost end of FIG. 5A, a waveform of the adjusted AC voltage $V_{AC}'$ adjusted by the first line capacitor $C_{L1}$ and the second line capacitor $C_{L2}$ and input to the second rectifying unit 1420 is illustrated below a waveform diagram of the AC voltage $V_{AC}$, a waveform of the current $I_{AC}$ input from the AC power supply is illustrated below a waveform diagram of the adjusted AC voltage, a waveform of the driving voltage $V_P$ input to the LED light emitting module 1300 is illustrated below a waveform diagram of the current, and a waveform of the LED driving current $I_{LED}$ flowing to the LED light emitting module 1300 is illustrated at the lowermost end of FIG. 5A. In addition, a waveform of a charged current and a discharged current of the first line capacitor $C_{L1}$ is illustrated at the uppermost end of FIG. 5B, a waveform of a charged current and a discharged current of the second line capacitor $C_{L2}$ is illustrated below the uppermost end of FIG. 5B, and a waveform of a charged current and a discharged current of the charging or discharging capacitor $C_{dc1}$ is illustrated at the lowermost end of FIG. 5B.

The waveforms illustrated in FIGS. 5A and 5B are based on an exemplary embodiment of the LED driving circuit 1500 configured to perform the compensation for the second forward voltage level $V_{f2}$. Hereinafter, an exemplary embodiment in which the LED driving circuit 1500 is configured to perform the compensation for the second forward voltage level $V_{f2}$ to supply the second driving voltage to the first LED group 1301 and the second LED group 1302 in the compensation section (the section in which the first rectified voltage Vrec1 is less than the second forward voltage level $V_{f2}$) will be described. However, this is for convenience of explanation and understanding, and the present invention is not limited thereto.

Meanwhile, the following Table 1 shows charging or discharging states of the first line capacitor $C_{L1}$, charging or discharging states of the second line capacitor $C_{L2}$, charging or discharging states of the charging or discharging capacitor $C_{dc1}$, and operation states of the LED groups 1301 to 1304 depending on the voltage level of the first driving voltage based on one period of the AC voltage $V_{AC}$. Hereinafter, a driving process of the LED illumination device according to an exemplary embodiment of the present invention will be described in detail with reference to FIGS. 5 and 5B and Table 1.

As described above, since the LED driving circuit 1500 is configured to perform the compensation for the second forward voltage level $V_{f2}$, the compensation section is a section in which the voltage level of the first driving voltage is less than $V_{f2}$ and the non-compensation section is a section in which the voltage level of the first driving voltage is $V_{f2}$ or more. In addition, the waveform diagrams illustrated in FIGS. 5A and 5B represent waveforms at a point in time at which a predetermined time elapses after the LED illumination device 1000 is driven. Therefore, in FIGS. 5A and 5B, the compensation section is time sections $t_0$ to $t_1$, $t_6$ to $t_8$, and $t_{14}$ to $t_{15}$.

At a point in time $t_0$, the voltage level of the first driving voltage is less than $V_{f2}$, such that voltage compensation is performed by the second driving voltage providing module 1400. More specifically, a state at the point in time $t_0$ is a state in which a current that has been charged in the charging or discharging capacitor $C_{dc1}$ in a compensation section immediately before the point in time $t_0$ is completely discharged. Therefore, the second line capacitor $C_{L2}$ that has been charged during the previous negative half period of the AC voltage $V_{AC}$ starts to discharge the discharged current $I_{dis}$ at the point in time $t_0$. That is, compensation for the driving voltage in the time section $t_0$ to $t_1$ is performed by the second line capacitor $C_{L2}$. In FIG. 5B, the discharged current $I_{dis}$ discharged from the second line capacitor $C_{L2}$ during the time section $t_0$ to $t_1$ is illustrated. The discharged current $I_{dis}$ from the second line capacitor $C_{L2}$ is applied to the LED light emitting module 1300 through the diode $D_4$ of the first rectifying module 1100. Therefore, the second driving voltage is provided to the LED light emitting module 1300. Since the applied driving voltage $V_p$ is the second forward voltage level $V_{f2}$ or more, the LED driving control unit 1210 maintains the first LED group driving unit 1201, the third LED group driving unit 1203, and the fourth LED group driving unit 1204 in a turn-off state and maintains the second LED group driving unit 1202 in a turn-on state to maintain a state in which the current path $P_2$ is connected. Therefore, the second LED driving current $I_{LED2}$ flows through the second current path $P_2$, such that the first and second LED groups 1301 and 1302 maintain a light-emitting state.

As a time elapses, the voltage level of the AC voltage $V_{AC}$ rises, such that the voltage level of the first driving voltage arrives at the second forward voltage level $V_{f2}$ (point in time $t_1$). In this case, a time section is out of the compensation section and enters the non-compensation section, such that the first rectified voltage Vrec1 is supplied as the driving voltage $V_p$ to the LED light emitting module 1300. Since a voltage level itself of the driving voltage $V_p$ is in the same range as that of the second driving voltage that has been

TABLE 1

| Vrec1 | $C_{L1}$ | $C_{L2}$ | $C_{dc1}$ | LED G1 | LED G2 | LED G3 | LED G4 |
|---|---|---|---|---|---|---|---|
| $0 \leq Vrec1 < V_{f2}$ | — | discharging | — | ON | ON | OFF | OFF |
| $V_{f2} \leq Vrec1 < V_{f3}$ | charging | — | charging | ON | ON | OFF | OFF |
| $V_{f3} \leq Vrec1 < V_{f4}$ | charging | — | charging | ON | ON | ON | OFF |
| $V_{f4} \leq Vrec1$ | charging | — | charging | ON | ON | ON | ON |
| $V_{f3} \leq Vrec1 < V_{f4}$ | — | — | — | ON | ON | ON | OFF |
| $V_{f2} \leq Vrec1 < V_{f3}$ | — | — | — | ON | ON | OFF | OFF |
| $0 \leq Vrec1 < V_{f2}$ | — | — | discharging | ON | ON | OFF | OFF |
| $0 \leq Vrec1 < V_{f2}$ | discharging | — | — | ON | ON | OFF | OFF |
| $V_{f2} \leq Vrec1 < V_{f3}$ | — | charging | charging | ON | ON | OFF | OFF |
| $V_{f3} \leq Vrec1 < V_{f4}$ | — | charging | charging | ON | ON | ON | OFF |
| $V_{f4} \leq Vrec1$ | — | charging | charging | ON | ON | ON | ON |
| $V_{f3} \leq Vrec1 < V_{f4}$ | — | — | — | ON | ON | ON | OFF |
| $V_{f2} \leq Vrec1 < V_{f3}$ | — | — | — | ON | ON | OFF | OFF |
| $Vrec1 < V_{f2}$ | — | — | discharging | ON | ON | OFF | OFF | supplied in the previous time section $t_0$ to $t_1$, the LED driving control unit 1210 maintains the state in which the current path $P_2$ is connected. Therefore, the second LED driving current $I_{LED2}$ flows through the second current path $P_2$, such that the first and second LED groups 1301 and 1302 maintain the light-emitting state. In addition, at this point in time $t_1$, the first line capacitor $C_{L1}$ and the charging or discharging capacitor $C_{dc1}$ start to be charged. Since this point in time $t_1$ corresponds to the positive half period of the AC power, the second line capacitor $C_{L2}$ is not charged. The first line capacitor $C_{L1}$ and the charging or discharging capacitor $C_{dc1}$ are continuously charged until they are completely charged. In FIG. 5B, the charged current $I_c$ charged in the first line capacitor $C_{L1}$ and the charging or discharging capacitor $C_{dc1}$ after the point in time $t_1$ is illustrated.

In a time section $t_1$ to $t_6$, the voltage level of the first rectified voltage Vrec1 is the second forward voltage level $V_{f2}$ or more, such that the time section $t_1$ to $t_6$ corresponds to the non-compensation section. Therefore, the LED driving control unit 1210 controls the LED groups 1301 to 1304 to be sequentially driven depending on the voltage level of the first rectified voltage Vrec1 applied as the driving voltage $V_p$. This will be briefly described. As a time elapses, the voltage level of the first rectified voltage Vrec1 rises to arrive at the third forward voltage level $V_{f3}$ (point in time $t_2$). In this case, the LED driving control unit 1210 turns off the second LED group driving unit 1202 and turns on the third LED group driving unit 1203 to allow the third current path $P_3$ to be connected. Therefore, the third LED driving current $I_{LED3}$ flows through the third current path $P_3$, such that the first to third LED groups 1301 to 1303 emit light.

In addition, as a time elapses, the voltage level of the first rectified voltage Vrec1 rises to arrive at the fourth forward voltage level $V_{f4}$ (point in time $t_3$). In this case, the LED driving control unit 1210 turns off the third LED group driving unit 1203 and turns on the fourth LED group driving unit 1204 to allow the fourth current path $P_4$ to be connected. Therefore, the fourth LED driving current $I_{LED4}$ flows through the fourth current path $P_4$, such that all of the first to fourth LED groups 1301 to 1304 emit light.

Then, as a time elapses, the voltage level of the first rectified voltage Vrec1 arrives at the highest point and then falls to become less than the fourth forward voltage level $V_{f4}$ (point in time $t_4$). In this case, the LED driving control unit 1210 turns off the fourth LED group driving unit 1204 and turns on the third LED group driving unit 1203 to allow the third current path $P_3$ to be connected. Therefore, the third LED driving current $I_{LED3}$ flows through the third current path $P_3$, such that the first to third LED groups 1301 to 1303 emit light.

In addition, as a time elapses, the voltage level of the first rectified voltage Vrec1 falls to become less than the third forward voltage level $V_{f3}$ (point in time $t_5$). In this case, the LED driving control unit 1210 turns off the third LED group driving unit 1203 and turns on the second LED group driving unit 1202 to allow the second current path $P_2$ to be connected. Therefore, the second LED driving current $I_{LED2}$ flows through the second current path $P_2$, such that the first to third LED groups 1301 to 1303 emit light.

Meanwhile, as a time elapses, the voltage level of the first rectified voltage Vrec1 falls to become less than the second forward voltage level $V_{f2}$ (point in time $t_6$). In this case, the first rectified voltage Vrec1 may not drive the first and second LED groups 1301 and 1302. Therefore, at this point in time, voltage compensation is performed. More specifically, at this point in time, the voltage level of the charged charging or discharging capacitor $C_{dc1}$ becomes higher than that of the first rectified voltage Vrec1, such that the discharged current $I_{dis}$ starts to flow from the charging or discharging capacitor $C_{dc1}$ to the LED light emitting module 1300. Therefore, the second driving voltage is provided as the driving voltage $V_p$ to the LED light emitting module 1300. In FIG. 5B, the discharged current $I_{dis}$ discharged from the charging or discharging capacitor $C_{dc1}$ during a time section $t_6$ to $t_7$ is illustrated. Meanwhile, since the compensation for the second forward voltage level $V_{f2}$ is performed by the charging or discharging capacitor $C_{dc1}$ during the time section $t_6$ to $t_7$, the LED driving control unit 1210 maintains the state in which the current path $P_2$ is connected. Therefore, the second LED driving current $I_{LED2}$ flows through the second current path $P_2$, such that the first and second LED groups 1301 and 1302 maintain the light-emitting state.

In addition, as a time elapses, the voltage level of the charging or discharging capacitor $C_{dc1}$ becomes smaller than that of the first line capacitor $C_{L1}$ due to the discharging of the charging or discharging capacitor $C_{dc1}$ (point in time $t_7$). In this case, the discharging of the charging or discharging capacitor $C_{dc1}$ ends, and the discharged current $I_{dis}$ is supplied from the first line capacitor $C_{L1}$ to the LED light emitting module 1300 through the diode $D_1$ of the first rectifying module 1100. In FIG. 5B, the discharged current $I_{dis}$ discharged from the first line capacitor $C_{L1}$ during a time section $t_7$ to $t_8$ is illustrated. Since the compensation for the second forward voltage level $V_{f2}$ is performed by the first line capacitor $C_{L1}$ during the time section $t_7$ to $t_8$, similar to the time section $t_6$ to $t_7$, the LED driving control unit 1210 maintains the state in which the current path $P_2$ is connected. Therefore, the second LED driving current $I_{LED2}$ flows through the second current path $P_2$, such that the first and second LED groups 1301 and 1302 maintain the light-emitting state.

The processes as described above are periodically repeated, such that the first and second LED groups 1301 and 1302 continuously maintain the light-emitting state during a period in which the LED illumination device 1000 is driven. Therefore, the flicker phenomenon of the LED illumination device 1000 may be removed. Here, it is to be noted that the second line capacitor $C_{L2}$ that has been charged during the previous negative half period discharges the discharged current $I_{dis}$ at a point in time in which the positive half period of the AC power starts, such that the second driving voltage is provided and the first line capacitor $C_{L1}$ is charged, and the first line capacitor $C_{L1}$ that has been charged during the positive half period discharges the discharged current $I_{dis}$ at a point in time in which the negative half period starts, thereby providing the second driving voltage.

Configuration and Function of Second Driving Voltage Providing Module According to Second Exemplary Embodiment FIG. 6 is a block diagram illustrating a detailed configuration of an LED illumination device according to another exemplary embodiment of the present invention. A configuration and a function of a second driving voltage providing module 1400 according to a second exemplary embodiment of the present invention will be described with reference to FIG. 6.

First, a feature of the LED driving circuit 1500 according to the present invention will be described once again. The most significant technical feature of the LED driving circuit 1500 according to the present invention is that the LED driving circuit 1500 is configured to supply AC power from the same AC power supply as the first driving voltage (current) to the LED driving module 1200 and the LED light emitting module 1300 without decoupling the AC power and at the same time, convert the AC power from the same AC power supply into DC power and provide DC power decoupled from the AC power as the second driving voltage to the LED driving module 1200 and the LED light emitting module 1300 during the compensation section. The second driving voltage providing module 1400 according to a second exemplary embodiment of the present invention is also a component for implementing the technical feature of the present invention as described above. However, the second driving voltage providing module 1400 according to a first exemplary embodiment as described above is configured to charge or discharge energy, while the second driving voltage providing module 1400 according to a second exemplary embodiment is configured to continuously output a stabilized constant voltage as a second driving voltage.

The second driving voltage providing module 1400 according to a second exemplary embodiment of the present invention is connected to an AC power supply in parallel with a first rectifying module 1100, and is configured to convert an applied AC voltage $V_{AC}$ to generate a DC voltage and provide the generated DC voltage as a second driving voltage to an LED light emitting module 1300 in a compensation section. In order to perform the above-mentioned function, the second driving voltage providing module 1400 according to a second exemplary embodiment of the present invention may include a power converting unit 1440 and a first rectified voltage blocking unit $D_{B1}$, as illustrated in FIG. 6.

The power converting unit 1440 is connected to the AC power supply in parallel with the first rectifying module 1100, and is configured to convert the AC voltage $V_{AC}$ applied from the AC power supply to generate a stable DC voltage $V_{DC}$ and output the generated DC voltage. As the power converting unit 1440, one of various known AC to DC converters may be used. The stable DC voltage output from the power converting unit 1440 may be determined depending on a compensated forward voltage level. For example, in the case in which the LED driving circuit 1500 according to the present invention is configured to perform compensation for a second forward voltage level $V_{f2}$, a voltage level of the DC voltage output from the power converting unit 1440 is the second forward voltage level $V_{f2}$. Similarly, for example, in the case in which the LED driving circuit 1500 according to the present invention is configured to perform compensation for a first forward voltage level $V_{f1}$, a voltage level of the DC voltage output from the power converting unit 1440 is the first forward voltage level $V_{f1}$.

Meanwhile, the first rectified voltage blocking unit $D_{B1}$ is connected between a first output terminal of the first rectifying module 1100 and the power converting unit 1440 in series and is configured to block a first rectified voltage output from the first rectifying module.

An output terminal of the power converting unit 1440 is connected to the first output terminal of the first rectifying module 1100 through the first rectified voltage blocking unit $D_{B1}$. Therefore, in the case in which the LED driving circuit 1500 according to the present invention is configured to perform the compensation for the first forward voltage level $V_{f1}$, the DC voltage output from the power converting unit 1440 is supplied as the second driving voltage to the LED light emitting module 1300 in a section in which a voltage level of a rectified voltage Vrec output from the first rectifying module 1100 is less than the first forward voltage level $V_{f1}$. As a result, the compensation for the first forward voltage level $V_{f1}$ may be performed.

Meanwhile, although the configuration and the function of the LED driving circuit 1500 according to the present invention based on the LED light emitting module 1300 including the plurality of LED groups 1301 to 1304 that are sequentially driven have been described hereinabove, the present invention is not limited thereto. That is, the technical gist of the present invention is the configuration and the function of the second driving voltage providing module 1400. Therefore, the LED driving circuit 1500 according to the present invention may also be applied to the LED light emitting module 1300 including a single LED group. In this case, since a sequential driving control is not required, the LED driving module 1200 may be omitted. In addition, the second driving voltage providing module 1400 is configured to perform the compensation for the first forward voltage level $V_{f1}$. Therefore, in the non-compensation section (section in which a voltage level of a first driving voltage is less than the forward voltage level $V_{f1}$), the second driving voltage is provided by the second driving voltage providing module 1400.

The invention claimed is:

1. A light emitting diode (LED) driving circuit comprising:
   a first rectifying module connected to an alternating current (AC) power supply, the first rectifying module configured to full-wave-rectify an applied AC voltage and provide a first rectified voltage that is full-wave-rectified as a first driving voltage to an LED light emitting module; and
   a second driving voltage providing module connected to the AC power supply in parallel with the first rectifying module, the second driving voltage configured to full-wave-rectify the applied AC voltage to generate a second rectified voltage, charge energy using the second rectified voltage in a charging section, and provide a second driving voltage to the LED light emitting module in a compensation section, wherein the compensation section is a section in which a voltage level of the first rectified voltage is less than a first forward voltage level ($V_{f1}$).

2. The LED driving circuit of claim 1, wherein the second driving voltage providing module comprises:
   a first line capacitor connected between a first output terminal of the AC power supply and a first input terminal of a second rectifying unit in series, the first line capacitor configured to adjust the AC voltage applied from the AC power supply, and output the adjusted AC voltage to the first input terminal of the second rectifying unit;
   a second line capacitor connected between a second output terminal of the AC power supply and a second input terminal of the second rectifying unit in series, the second line capacitor configured to adjust the AC voltage applied from the AC power supply and output the adjusted AC voltage to the second input terminal of the second rectifying unit;
   the second rectifying unit configured to full-wave-rectify the adjusted AC voltages input from the first line capacitor and the second line capacitor to generate and output the second rectified voltage; and
   an energy charging or discharging unit connected between first and second output terminals of the second rectifying unit, the energy charging or discharging unit being charged by receiving the second rectified voltage in the charging section, and discharged in the compensation section to provide the second driving voltage.

3. The LED driving circuit of claim 2, wherein the first line capacitor and the second line capacitor are configured to delay a phase of the applied AC voltage and step down the applied AC voltage.

4. The LED driving circuit of claim 2, wherein the energy charging or discharging unit comprises:
an energy charging or discharging element configured to be charged by receiving the second rectified voltage in the charging section and discharged in the compensation section to provide the second driving voltage; and
a first rectified voltage blocking unit connected between a first output terminal of the first rectifying module and the energy charging or discharging element in series, the first rectified voltage blocking unit configured to block the first rectified voltage output from the first rectifying module, such that the first rectified voltage is not charged in the energy charging or discharging element.

5. The LED driving circuit of claim 4, wherein the energy charging or discharging element comprises a charging or discharging capacitor.

6. The LED driving circuit of claim 4, wherein the first rectified voltage blocking unit comprises a diode.

7. The LED driving circuit of claim 2, wherein capacitances of the first line capacitor and the second line capacitor are the same as each other.

8. The LED driving circuit of claim 2, wherein the first line capacitor or the second line capacitor is configured to be charged by the applied AC voltage in the charging section and is discharged in a section in which the second driving voltage is not provided by the energy charging or discharging unit in the compensation section to provide the second driving voltage to the LED light emitting module through the first rectifying module.

9. The LED driving circuit of claim 1, wherein:
the LED light emitting module comprises first to n-th LED groups, n being an integer of 2 or more; and
the LED driving circuit further comprises an LED driving module configured to sequentially drive the first to n-th LED groups depending on a voltage level of the first driving voltage in a non-compensation section and drive at least one of the first to n-th LED groups depending on a voltage level of the second driving voltage in the compensation section.

10. The LED driving circuit of claim 9, wherein the compensation section is a section in which a voltage level of the first rectified voltage is less than a second forward voltage ($V_{f2}$).

11. A light-emitting diode (LED) driving circuit comprising:
a first rectifying module connected to an alternating current (AC) power supply, the first rectifying module configured to wave-rectify an applied AC voltage and provide a first rectified voltage that is full-wave-rectified as a first driving voltage to the LED light emitting module; and
a second driving voltage providing module connected to the AC power supply in parallel with the first rectifying module, the second driving voltage configured to convert the applied AC voltage to generate a direct current (DC) voltage, and provide the generated DC voltage as a second driving voltage to the LED light emitting module, wherein the second driving voltage providing module comprises:
a power converting unit configured to convert the AC voltage input from the AC power supply to generate the DC voltage; and
a first rectified voltage blocking unit connected between a first output terminal of the first rectifying module and the power converting unit in series, the first rectified voltage blocking unit configured to block the first rectified voltage output from the first rectifying module.

12. A light-emitting diode (LED) driving circuit comprising:
a first rectifying module connected to an alternating current (AC) power supply, the first rectifying module configured to wave-rectify an applied AC voltage and provide a first rectified voltage that is full-wave-rectified as a first driving voltage to the LED light emitting module; and
a second driving voltage providing module connected to the AC power supply in parallel with the first rectifying module, the second driving voltage configured to convert the applied AC voltage to generate a direct current (DC) voltage, and provide the generated DC voltage as a second driving voltage to the LED light emitting module in a compensation section, wherein:
the LED light emitting module comprises first to n-th LED groups, n being an integer of 2 or more; and
the LED driving circuit further comprises an LED driving module, the LED driving module configured to sequentially drive the first to n-th LED groups depending on a voltage level of the first driving voltage in a non-compensation section and drive at least one of the first to n-th LED groups depending on a voltage level of the second driving voltage in the compensation section.

13. A light-emitting diode (LED) illumination device comprising:
a first rectifying module connected to an alternating current (AC) power supply, the first rectifying module configured to full-wave-rectify an applied AC voltage and provide a first rectified voltage that is full-wave-rectified as a first driving voltage to an LED light emitting module;
a second driving voltage providing module connected to the AC power supply in parallel with the first rectifying module, the second driving voltage providing module configured to full-wave-rectify the applied AC voltage to generate a second rectified voltage, charge energy using the generated second rectified voltage in a charging section, and provide a second driving voltage to the LED light emitting module in a compensation section; and
the LED light emitting module configured to be driven by receiving the first driving voltage provided from the first rectifying module in a non-compensation section and driven by receiving the second driving voltage provided from the second driving voltage providing module in the compensation section.

14. The LED illumination device of claim 13, wherein the second driving voltage providing module comprises:
a first line capacitor connected between a first output terminal of the AC power supply and a first input terminal of a second rectifying unit in series, the first line capacitor configured to adjust the AC voltage applied from the AC power supply, and output the adjusted AC voltage to the first input terminal of the second rectifying unit;
a second line capacitor connected between a second output terminal of the AC power supply and a second input terminal of the second rectifying unit in series, the second line capacitor configured to adjust the AC voltage applied from the AC power supply, and output the adjusted AC voltage to the second input terminal of the second rectifying unit;
the second rectifying unit configured to full-wave-rectify the adjusted AC voltages input from the first line capacitor and the second line capacitor to generate and output the second rectified voltage; and an energy charging or discharging unit connected between first and second output terminals of the second rectifying unit, the energy charging or discharging unit configured to be charged by receiving the second rectified voltage in the charging section, and discharged in the compensation section to provide the second driving voltage.

15. The LED illumination device of claim 14, wherein the first line capacitor and the second line capacitor are configured to delay a phase of the applied AC voltage and step down the applied AC voltage.

16. The LED illumination device of claim 14, wherein the energy charging or discharging unit comprises:
an energy charging or discharging element configured to be charged by receiving the second rectified voltage in the charging section and discharged in the compensation section to provide the second driving voltage; and
a first rectified voltage blocking unit connected between a first output terminal of the first rectifying module and the energy charging or discharging element in series, the first rectified voltage blocking unit configured to block the first rectified voltage output from the first rectifying module, such that the first rectified voltage is not charged in the energy charging or discharging element.

17. The LED illumination device of claim 16, wherein the energy charging or discharging element comprises a charging or discharging capacitor.

18. The LED illumination device of claim 16, wherein the first rectified voltage blocking unit comprises a diode.

19. The LED illumination device of claim 14, wherein capacitances of the first line capacitor and the second line capacitor are the same as each other.

20. The LED illumination device of claim 14, wherein:
the first line capacitor or the second line capacitor is configured to be charged by the applied AC voltage in the charging section and discharged in a section in which the second driving voltage is not provided by the energy charging or discharging unit in the compensation section to provide the second driving voltage to the LED light emitting module through the first rectifying module, and
the LED light emitting module is configured to be driven by receiving the second driving voltage in the section in which the second driving voltage is not provided in the compensation section.

21. The LED illumination device of claim 13, wherein the compensation section is a section in which a voltage level of the first rectified voltage is less than a first forward voltage level ($V_{f1}$).

22. The LED illumination device of claim 13, wherein:
the LED light emitting module comprises first to n-th LED groups, n being an integer of 2 or more;
the LED illumination device further comprises an LED driving module, the LED driving module configured to sequentially drive the first to n-th LED groups depending on a voltage level of the first driving voltage in the non-compensation section and drive at least one of the first to n-th LED groups depending on a voltage level of the second driving voltage in the compensation section;
the LED light emitting module is configured to be sequentially driven depending on a control of the LED driving module by receiving the first driving voltage provided from the first rectifying module; and
at least one LED group is configured to be driven depending on a control of the LED driving module by receiving the second driving voltage provided from the second driving voltage providing module in the compensation section.

23. The LED illumination device of claim 22, wherein the compensation section comprises a section in which a voltage level of the first rectified voltage is less than a second forward voltage level ($V_{f2}$).

24. A light-emitting diode (LED) illumination device, comprising:
a first rectifying module connected to an alternating current (AC) power supply, the first rectifying module configured to full-wave-rectify an applied AC voltage, and provide a first rectified voltage that is full-wave-rectified as a first driving voltage to an LED light emitting module;
a second driving voltage providing module connected to the AC power supply in parallel with the first rectifying module, the second driving voltage providing module configured to convert the applied AC voltage to generate a direct current (DC) voltage and provide the generated DC voltage as a second driving voltage to the LED light emitting module in a compensation section; and
the LED light emitting module configured to be driven by receiving the first driving voltage provided from the first rectifying module in a non-compensation section and driven by receiving the second driving voltage provided from the second driving voltage providing module in the compensation section.

25. The LED illumination device of claim 24, wherein the second driving voltage providing module comprises:
a power converting unit configured to convert the AC voltage input from the AC power supply to generate the DC voltage; and
a first rectified voltage blocking unit connected between a first output terminal of the first rectifying module and the power converting unit in series, the first rectified voltage blocking unit configured to block the first rectified voltage output from the first rectifying module.

26. The LED illumination device of claim 24, wherein:
the LED light emitting module comprises first to n-th LED groups, n being an integer of 2 or more;
the LED illumination device further comprises an LED driving module configured to sequentially drive the first to n-th LED groups depending on a voltage level of the first driving voltage in the non-compensation section and drive at least one of the first to n-th LED groups depending on a voltage level of the second driving voltage in the compensation section;
the LED light emitting module is configured to be sequentially driven depending on a control of the LED driving module by receiving the first driving voltage provided from the first rectifying module; and
at least one LED group is configured to be driven depending on a control of the LED driving module by receiving the second driving voltage provided from the second driving voltage providing module in the compensation section.

* * * * *